(12) United States Patent
Kaye et al.

(10) Patent No.: US 8,043,757 B2
(45) Date of Patent: Oct. 25, 2011

(54) EFFICIENT MICRO FUEL CELL SYSTEMS AND METHODS

(75) Inventors: Ian W. Kaye, Livermore, CA (US); Gerry Tucker, Pleasanton, CA (US)

(73) Assignee: UltraCell Acquisition Company, L.L.C., Commack, NY (US)

( * ) Notice: Subject to any disclaimer, the term of this patent is extended or adjusted under 35 U.S.C. 154(b) by 181 days.

(21) Appl. No.: 12/344,077

(22) Filed: Dec. 24, 2008

(65) Prior Publication Data

US 2009/0123797 A1  May 14, 2009

Related U.S. Application Data

(62) Division of application No. 10/877,771, filed on Jun. 25, 2004, now Pat. No. 7,763,368.

(60) Provisional application No. 60/482,996, filed on Jun. 27, 2003, provisional application No. 60/483,416, filed on Jun. 27, 2003, provisional application No. 60/482,981, filed on Jun. 27, 2003.

(51) Int. Cl.
H01M 8/04 (2006.01)

(52) U.S. Cl. ........ 429/436; 429/441; 429/433; 429/434; 429/430; 429/442

(58) Field of Classification Search .................. 429/429, 429/436, 441, 433, 434, 430, 442
See application file for complete search history.

(56) References Cited

U.S. PATENT DOCUMENTS

| | | | |
|---|---|---|---|
| 3,973,993 A | 8/1976 | Bloomfield et al. |
| 4,128,700 A | 12/1978 | Sederquist |
| 4,686,157 A | 8/1987 | Miyake et al. |
| 4,737,161 A | 4/1988 | Szydlowski et al. |
| 4,965,143 A | 10/1990 | Mizuno et al. |
| 5,081,095 A | 1/1992 | Bedford et al. |
| 5,434,015 A | 7/1995 | Yamada et al. |
| 5,525,436 A | 6/1996 | Savinell et al. |
| 5,534,328 A | 7/1996 | Ashmead et al. |
| 5,601,938 A | 2/1997 | Mayer et al. |
| 5,611,214 A | 3/1997 | Wegeng et al. |

(Continued)

FOREIGN PATENT DOCUMENTS

DE  44 46 841  7/1996

(Continued)

OTHER PUBLICATIONS

Office Action dated Dec. 9, 2008 in U.S. Appl. No. 10/877,769.

(Continued)

*Primary Examiner* — Helen O Conley
(74) *Attorney, Agent, or Firm* — Keusey & Associates, P.C.

(57) ABSTRACT

Fuel cell systems and methods are described. A method for generating electrical energy in a fuel cell receives hydrogen from a fuel processor configured to process a fuel source to produce the hydrogen, includes transporting a heating medium from the fuel processor to the fuel cell when electrical energy output by the fuel cell includes less than an electrical threshold or when temperature of a component in the fuel cell is less than a temperature threshold, heating a portion of the fuel cell, transporting hydrogen from the fuel processor to the fuel cell, detecting temperature of the component or electrical output of the fuel cell, and generating electrical energy in the fuel cell when the temperature of the component is about equal to or greater than the threshold temperature or when electrical energy output by the fuel cell is about equal to or greater than an electrical threshold.

20 Claims, 19 Drawing Sheets

U.S. PATENT DOCUMENTS

| | | | |
|---|---|---|---|
| 5,641,585 A | 6/1997 | Lessing et al. | |
| 5,716,727 A | 2/1998 | Savinell et al. | |
| 5,789,093 A | 8/1998 | Malhi | |
| 5,811,062 A | 9/1998 | Wegeng et al. | |
| 5,961,930 A | 10/1999 | Chatterjee et al. | |
| 5,961,932 A | 10/1999 | Ghosh et al. | |
| 6,077,620 A | 6/2000 | Pettit | |
| 6,080,501 A | 6/2000 | Kelley et al. | |
| 6,103,411 A | 8/2000 | Matsubayashi et al. | |
| 6,193,501 B1 | 2/2001 | Masel et al. | |
| 6,200,536 B1 | 3/2001 | Tonkovich et al. | |
| 6,235,983 B1 | 5/2001 | Becker | |
| 6,245,214 B1 | 6/2001 | Rehg et al. | |
| 6,268,077 B1 | 7/2001 | Kelley et al. | |
| 6,312,846 B1 | 11/2001 | Marsh | |
| 6,406,808 B1 | 6/2002 | Pratt et al. | |
| 6,410,175 B1 * | 6/2002 | Tillmetz et al. | 429/424 |
| 6,415,860 B1 | 7/2002 | Kelly et al. | |
| 6,423,434 B1 | 7/2002 | Pratt et al. | |
| 6,460,733 B2 | 10/2002 | Acker et al. | |
| 6,465,119 B1 | 10/2002 | Koripella et al. | |
| 6,470,569 B1 | 10/2002 | Lippert et al. | |
| 6,537,506 B1 | 3/2003 | Schwalbe et al. | |
| 6,541,676 B1 | 4/2003 | Franz et al. | |
| 6,569,550 B2 | 5/2003 | Khelifa | |
| 6,569,553 B1 | 5/2003 | Koripella et al. | |
| 6,638,654 B2 | 10/2003 | Jankowksi et al. | |
| 6,673,130 B2 | 1/2004 | Jankowksi et al. | |
| 6,753,036 B2 | 6/2004 | Jankowksi et al. | |
| 6,777,116 B1 * | 8/2004 | Muller et al. | 429/410 |
| 6,821,666 B2 | 11/2004 | Morse et al. | |
| 6,866,951 B2 | 3/2005 | Foley et al. | |
| 6,913,998 B2 | 7/2005 | Jankowski | |
| 6,921,603 B2 | 7/2005 | Morse | |
| 6,939,632 B2 | 9/2005 | Arana et al. | |
| 6,960,235 B2 | 11/2005 | Morse | |
| 6,960,403 B2 | 11/2005 | Morse | |
| 6,977,002 B2 | 12/2005 | Takimoto et al. | |
| 7,122,261 B2 | 10/2006 | Morse | |
| 7,186,352 B2 | 3/2007 | Morse | |
| 7,189,471 B2 | 3/2007 | Jankowksi | |
| 2001/0008718 A1 | 7/2001 | Kobayashi | |
| 2001/0016275 A1 | 8/2001 | Takamura | |
| 2001/0028968 A1 | 10/2001 | Griesneier | |
| 2001/0029974 A1 | 10/2001 | Cohen et al. | |
| 2002/0012825 A1 | 1/2002 | Sasahara et al. | |
| 2002/0028366 A1 | 3/2002 | Haltiner | |
| 2002/0045082 A1 | 4/2002 | Marsh | |
| 2002/0068203 A1 | 6/2002 | Hiyoshi et al. | |
| 2002/0071972 A1 | 6/2002 | Gebhardt et al. | |
| 2002/0076599 A1 | 6/2002 | Neutzler et al. | |
| 2002/0081468 A1 | 6/2002 | Shioya | |
| 2002/0094462 A1 | 7/2002 | Shioya et al. | |
| 2002/0098119 A1 | 7/2002 | Goodman | |
| 2002/0102451 A1 | 8/2002 | Acker et al. | |
| 2002/0106540 A1 | 8/2002 | Shioya | |
| 2002/0127141 A1 | 9/2002 | Acker | |
| 2002/0131915 A1 | 9/2002 | Shore et al. | |
| 2002/0132156 A1 | 9/2002 | Ruhl et al. | |
| 2002/0147107 A1 | 10/2002 | Abdo et al. | |
| 2002/0150804 A1 | 10/2002 | Srinivasan et al. | |
| 2002/0155335 A1 | 10/2002 | Kearl | |
| 2002/0192537 A1 | 12/2002 | Ren | |
| 2003/0006668 A1 | 1/2003 | Lal et al. | |
| 2003/0027022 A1 | 2/2003 | Arana et al. | |
| 2003/0031910 A1 | 2/2003 | Satou et al. | |
| 2003/0031913 A1 | 2/2003 | Pavio et al. | |
| 2003/0057199 A1 | 3/2003 | Villa et al. | |
| 2003/0082422 A1 | 5/2003 | Koschany | |
| 2003/0082423 A1 | 5/2003 | Kushibiki et al. | |
| 2003/0091502 A1 | 5/2003 | Holladay et al. | |
| 2003/0103878 A1 | 6/2003 | Morse | |
| 2003/0129462 A1 | 7/2003 | Yang et al. | |
| 2003/0129464 A1 | 7/2003 | Becerra et al. | |
| 2003/0138681 A1 | 7/2003 | Boneberg et al. | |
| 2003/0165728 A1 | 9/2003 | Meguriya et al. | |
| 2003/0194363 A1 | 10/2003 | Koripella | |
| 2003/0198844 A1 | 10/2003 | Ukai et al. | |
| 2003/0235732 A1 | 12/2003 | Haltiner, Jr. | |
| 2004/0009381 A1 | 1/2004 | Sakai et al. | |
| 2004/0043273 A1 | 3/2004 | Jankowksi | |
| 2004/0048128 A1 | 3/2004 | Jankowksi | |
| 2004/0062961 A1 | 4/2004 | Sato et al. | |
| 2004/0076861 A1 | 4/2004 | Mann et al. | |
| 2004/0137309 A1 | 7/2004 | Allen et al. | |
| 2004/0166385 A1 | 8/2004 | Morse | |
| 2004/0166395 A1 | 8/2004 | Jankowski | |
| 2004/0197610 A1 * | 10/2004 | Drunert | 429/13 |
| 2004/0211054 A1 | 10/2004 | Morse | |
| 2005/0008909 A1 | 1/2005 | Kaye | |
| 2005/0008911 A1 | 1/2005 | Kaye | |
| 2005/0011125 A1 | 1/2005 | Kaye | |
| 2005/0014040 A1 | 1/2005 | Kaye | |
| 2005/0014059 A1 | 1/2005 | Kaye | |
| 2005/0186455 A1 | 8/2005 | Kaye | |
| 2005/0244685 A1 | 11/2005 | Kim et al. | |
| 2006/0024543 A1 | 2/2006 | Kaye et al. | |

FOREIGN PATENT DOCUMENTS

| | | |
|---|---|---|
| DE | 19841993 | 3/2000 |
| GB | 002405744 | 3/2005 |
| JP | 62 066578 | 3/1987 |
| JP | 02 139871 | 5/1990 |
| WO | WO 00/45457 | 8/2000 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO 2004/030805 | 4/2004 |

OTHER PUBLICATIONS

International Search Report dated Apr. 2, 2008 from PCT Application No. PCT/US05/46423.

Written Opinion dated Apr. 2, 2008 from PCT Application No. PCT/US05/46423.

Office Action dated Aug. 5, 2008 from U.S. Appl. No. 11/830,669.

Chinese Office Action dated Jul. 18, 2008 from CN Patent Application No. 200480024524.9.

Office Action dated Jun. 16, 2008 from U.S. Appl. No. 10/877,769.

International Search Report dated Aug. 5, 2008 from PCT Application No. PCT/US07/17579.

Written Opinion dated Aug. 5, 2008 from PCT Application No. PCT/US07/17579.

U.S. Appl. No. 10/637,915, entitled: Solid Polymer MEMS-based Fuel Cells, by inventors: Jankowski, filed Aug. 8, 2003.

U.S. Appl. No. 10/783,230, entitled: Method for Fabrication of Electrodes, by inventors: Jankowski, filed Feb. 19, 2004.

U.S. Appl. No. 10/877,771, entitled "Efficient Micro Fuel Cell Systems and Methods", by inventors: Kaye, filed Jun. 25, 2004.

U.S. Appl. No. 10/877,770, entitled "Micro Fuel Cell Thermal Management", by inventors: Kaye, filed Jun. 25, 2004.

U.S. Appl. No. 10/877,044, entitled "Annular Fuel Processor and Methods", by inventors: Kaye, filed Jun. 25, 2004.

U.S. Appl. No. 10/877,826, entitled "Fuel Preheat in Fuel Cells and Portable Electronics", by inventors: Kaye, filed Jun. 25, 2004.

U.S. Appl. No. 10/877,824, entitled "Micro Fuel Cell Architecture", by inventors: Kaye, filed Jun. 25, 2004.

U.S. Appl. No. 10/877,769, entitled "Micro Fuel Cell System Start Up and Shut Down Systems and Methods", by inventors: Kaye, filed Jun. 25, 2004.

U.S. Appl. No. 10/612,177, entitled: Vapor-deposited Porous Films for Energy Conversion, by inventors: Jankowski, filed Jul. 1, 2003.

U.S. Appl. No. 10/131,846, entitled: Microfluidic Fuel Cell Systems with Embedded Materials and Structures and Method Thereof, by inventors: Morse, filed Apr. 24, 2002.

U.S. Appl. No. 10/007,412, entitled "Chemical Microreactor and Method Thereof", by inventors: Morse, filed Dec. 5, 2001.

U.S. Appl. No. 10/261,353, entitled: Bonded Polyimide Fuel Cell Package and Method Thereof, by inventors: Morse, filed Sep. 30, 2002.

U.S. Appl. No. 10/371,876, entitled: Metal Hydride Fuel Storage and Method Thereof, by inventors: Morse, filed Feb. 21, 2003.

U.S. Appl. No. 10/853,859, entitled: Microfluidic Systems with Embedded Materials and Structures and Method Thereof, by inventors: Morse, filed May 25, 2004.
U.S. Appl. No. 10/637,914, entitled: Solid Oxide MEMS-based Fuel Cells, by inventors: Jankowski, filed Aug. 8, 2003.
Office Action dated Jun. 6, 2008 from U.S. Appl. No. 11/829,932.
International Search Report dated Apr. 8, 2005 for PCT Application No. PCT/US2004/020517.
Written Opinion dated Apr. 8, 2005 for PCT Application No. PCT/US2004/020517.
Office Action from U.S. Appl. No. 10/877,771 dated Mar. 10, 2005.
Office Action from U.S. Appl. No. 10/877,771 dated Aug. 24, 2005.
Office Action from U.S. Appl. No. 10/877,771 dated Feb. 23, 2006.
Office Action from U.S. Appl. No. 10/877,771 dated Jul. 3, 2006.
Office Action from U.S. Appl. No. 10/877,771 dated Oct. 11, 2006.
Office Action dated Nov. 6, 2007 in Chinese Patent Application No. 200480024524.9.
Shankara Narayanan K.R., "What is a Heat Pipe", http://www.cheresources.com/htpipes.shtml.
S. Ahmed et al., "Catalytic Partial Oxidation Reforming of Hydrocarbon Fuels", Nov. 16-19, 1998, 1998 Fuel Cell Seminar, Palm Springs, CA.
A.R. Boccaccini et al., "Electrophoretic Deposition of Nanoceramic Particles onto Electrically Conducting Fibre Fabrics", Sep. 21-24, 1998, $43^{rd}$ International Scientific Colloquium, Technical University of Ilmenau.
J. Bostaph et al., "1W Direct Methanol Fuel Cell System as a Desktop Charger", Oct. 14, 2002, Motorola Labs, Tempe, AZ.
K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.
M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.
S. Ehrenberg et al., "One Piece Bi-Polar (OPB) Plate with Cold Plate Cooling", Dec. 13, 2002, Session PEM R&D II (2A), Dais Analytic—Rogers.
T.M. Floyd et al., "Liquid-Phase and Multi-Phase Microreactors for Chemical Synthesis", Jun. 1999, Massachusetts Institute of Technology, Cambridge, MA.
A.J. Franz et al., "High Temperature Gas Phase Catalytic and Membrane Reactors", Jun. 1999, Massachusetts Institute of Technology, Cambridge, MA.
J.D. Holladay et al., "Miniature Fuel Processors for Portable Fuel Cell Power Supplies", Nov. 26, 2002, Battelle Pacific Northwest Division, Richland, WA.
S.W. Janson et al., "MEMS, Microengineering and Aerospace Systems", 1999, The American Institute of Aeronautics and Astronautics, Inc.
J. Kaschmitter et al., "Micro-Fabricated Methanol/Water Reformers for Small PEM Fuel Cell Systems", Jul. 21-24, 2003, $8^{th}$ Electrochemical Power Sources R&D Symposium, Portsmouth, VA.
K. Keegan et al., "Analysis for a Planar Solid Oxide Fuel Cell Based Automotive Auxiliary Power Unit", Mar. 4-7, 2002, SAE 2002 World Congress, Detroit, MI.
K. Kempa et al., "Photonic Crystals Based on Periodic Arrays of Aligned Carbon Nanotubes", Oct. 3, 2002, Nano Letters 2003, vol. 3. No. 1, 13-18.
R. Kumar et al., "Solid Oxide Fuel Cell Research at Argonne National Laboratory", Mar. 29-30, 2001, $2^{nd}$ Solid Sate Energy Conversion Alliance Workshop, Arlington, VA.
S.H. Lee et al., "Removal of Carbon Monoxide from Reformate for Polymer Electrolyte Fuel Cell Application", Nov. 16-19, 1998, 1998 Fuel Cell Seminar, Palm Springs, CA.
Q. Li et al., "The CO Poisoning Effect in PEMFCs Operational at Temperatures up to 200° C.", 2003, Journal of The Electrochemical Society, 150 (12) A1599-A1605.
D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.
D.R. Palo et al., "Development of a Soldier-Portable Fuel Cell Power System, Part I: A Bread-Board Methanol Fuel Processor", 2002, Journal of Power Sources 108 (2002) 28-34.

A. Pattekar et al., "A Microreactor for In-situ Hydrogen Production by Catalytic Methanol Reforming", May 27-30, 2001, Proceedings of the $5^{th}$ International Conference on Microreaction Technology.
A. Pattekar et al., "Novel Microfluidic Interconnectors for High Temperature and Pressure Applications", 2003, Journal of Micromechanics and Microengineering, 13, 337-345.
D. Prater et al., "Systematic Examination of a Direct Methanol-Hydrogen Peroxide Fuel Cell", Sep. 22, 2001, Swift Enterprises, Ltd., Lafayette, IN.
W. Ruettinger et al., "A New Generation of Water Gas Shift Catalysts for Fuel Cell Applications", 2003, Journal of Power Sources, 118, 61-65.
O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.
R.F. Savinell et al., "High Temperature Polymer Electrolyte for PEM Fuel Cells", Sep. 4, 2002, Department of Chemical Engineering, Case Western Reserve University.
R. Srinivasan et al., "Micromachined Reactors for Catalytic Partial Oxidation Reactions", Nov. 1997, AIChe Journal, vol. 43, No. 11, 3059-3069.
S. Swartz et al., "Ceria-Based Water-Gas-Shift Catalysts", Aug. 1, 2003, NexTech Materials, Ltd., Wolrthington, OH.
S. Tasic et al., "Multilayer Ceramic Processing of Microreactor Systems", Oct. 14, 2002, Motorola Labs, Tempe, AZ.
V. Tomašić et al., "Development of the Structured Catalysts for the Exhaust Gas Treatment", 2001, Chem. Biochem. Eng. Q. 15 (3), 109-115.
TIAX LLC, "Advanced Hydrogen Storage: A System's Perspective and Some Thoughts on Fundamentals", Aug. 14-15, 2002, Presentation for DOE Workshop on Hydrogen Storage, Cambridge, MA.
Wan et al., "Catalyst Preparation: Catalytic Converter", Feb. 19, 2003, www.insightcentral.net/encatalytic.html.
J. Zalc et al., "Are Noble Metal-Based Water-Gas Shift Catalysts Practical for Automotive Fuel Processing?", 2002, Journal of Catalysis, 206, 169-171.
J. Zizelman et al., "Solid-Oxide Fuel Cell Auxiliary Power Unit: A Paradigm Shift in Electric Supply for Transportation", undated, Delphi Automotive Systems.
"Methanol-Powered Laptops—Cleared for Take-Off", www.silicon.com, Oct. 7, 2002.
Melissa Funk, "Methanol Fuel Quality Specification Study for Proton Exchange Membrane Fuel Cells, Final Report", XCELLSIS, Feb. 2002, 65 pages.
Dr. Detlef zur Megede et al., "MFCA Research Document, Complete", Methanol Fuel Cell Alliance, Sep. 2000, 242 pages.
Office Action dated Sep. 28, 2007 from Chinese Patent Application No. 200480024524.9.
Chinese Office Action dated Jun. 20, 2008 from CN Patent Application No. 200480024523.4.
Indian Examination Report dated Dec. 22, 2008 from IN Patent Application No. 013/KOLNP/2005.
Office Action dated Jul. 29, 2010 in U.S. Appl. No. 10/877,769.
Notice of Allowance dated Jun. 15, 2010 in U.S. Appl. No. 10/877,771.
Office Action dated Mar. 26, 2010 in U.S. Appl. No. 10/877,769.
Notice of Allowance dated Oct. 28, 2009 in U.S. Appl. No. 11/314,810.
Office Action dated Sep. 18, 2009 in U.S. Appl. No. 10/877,769.
Office Action dated Feb. 24, 2009 in U.S. Appl. No. 11/830,669.
Chinese Office Action dated Feb. 13, 2009 from CN Patent Application No. 200480024524.9.
Office Action dated Mar. 24, 2009 in U.S. Appl. No. 11/314,810.
Office Action dated Feb. 5, 2009 in U.S. Appl. No. 11/829,932.
U.S. Office Action dated May 1, 2009 in U.S. Appl. No. 10/877,769.
Supplemental European Search Report dated Oct. 29, 2009 from European Patent Application No. 04756161.8.
Notice of Allowance dated Jan. 13, 2011 in U.S. Appl. No. 11/830,274.

* cited by examiner

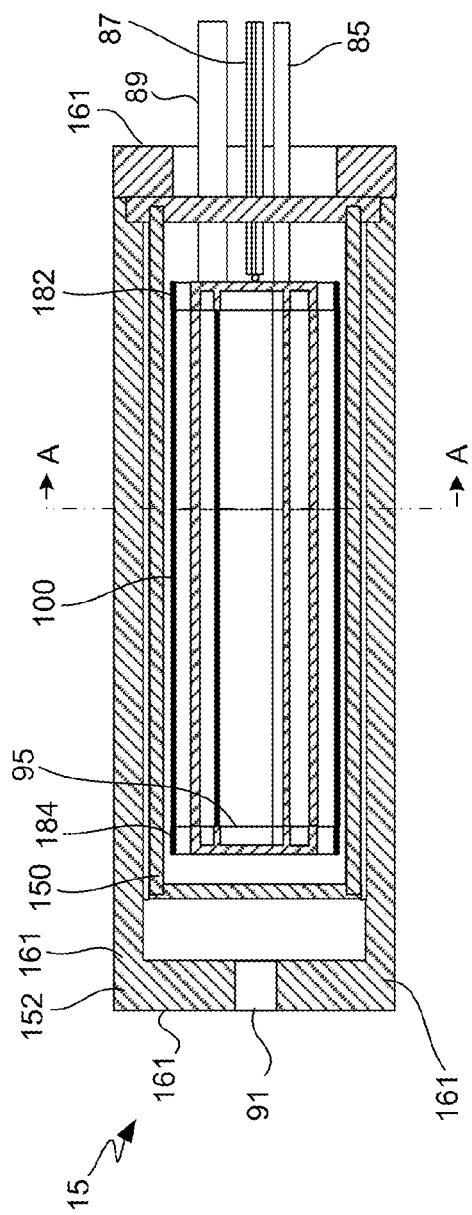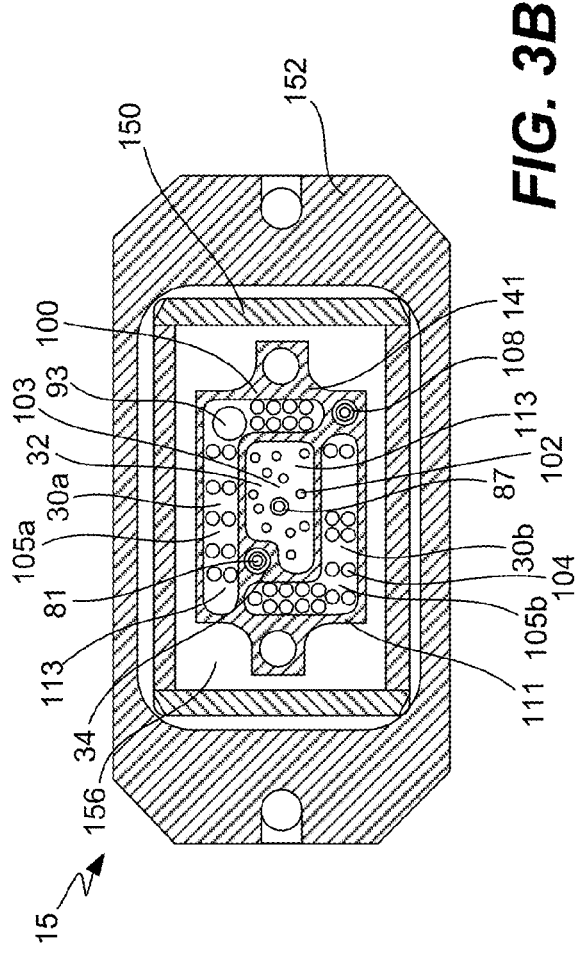

EFFICIENT MICRO FUEL CELL SYSTEMS AND METHODS

CROSS-REFERENCE TO RELATED APPLICATIONS

This application is a divisional of patent application Ser. No. 10/877,771, currently U.S. Pat. No. 7,763,368, entitled "Efficient Micro Fuel Cell Systems and Methods", filed Jun. 25, 2004, which claims priority under 35 U.S.C. §119(e) from U.S. Provisional Patent Application No. 60/482,996 entitled "Fuel cell system startup procedure and self-heating apparatus", filed Jun. 27, 2003; U.S. Provisional Patent Application No. 60/483,416 entitled "Fuel Preheat in Portable Electronics Powered by Fuel Cells", filed Jun. 27, 2003; and from U.S. Provisional Patent Application No. 60/482,981 entitled "Micro machined fuel stack with integral cooling and humidification", filed Jun. 27, 2003; all of which are incorporated by reference for all purposes.

BACKGROUND OF THE INVENTION

The present invention relates to fuel cell technology. In particular, the invention relates to systems for improving fuel cell system efficiency.

A fuel cell electrochemically combines hydrogen and oxygen to produce electrical energy. The ambient air readily supplies oxygen. Hydrogen provision, however, calls for a working supply. Gaseous hydrogen has a low energy density that reduces its practicality as a portable fuel. Liquid hydrogen, which has a suitable energy density, must be stored at extremely low temperatures and high pressures, making storing and transporting liquid hydrogen burdensome.

A reformed hydrogen supply processes a fuel source to produce hydrogen. The fuel source acts as a hydrogen carrier. Currently available hydrocarbon fuel sources include methanol, ethanol, gasoline, propane and natural gas. Liquid hydrocarbon fuel sources offer high energy densities and the ability to be readily stored and transported. A fuel processor reforms the hydrocarbon fuel source to produce hydrogen.

Fuel cell evolution so far has concentrated on large-scale applications such as industrial size generators for electrical power back-up. Consumer electronics devices and other portable electrical power applications currently rely on lithium ion and similar battery technologies. Fuel cell systems that generate electrical energy for portable applications such as electronics would be desirable but are not yet commercially available. In addition, techniques that increase fuel cell system efficiency would be beneficial.

SUMMARY OF THE INVENTION

The present invention relates to fuel cell systems and methods of using fuel cell systems. The systems include a fuel cell that generates electrical energy using hydrogen and a fuel processor that produces hydrogen from a fuel source. The fuel processor includes a reformer and a burner that heats the reformer.

A heat efficient fuel cell system described herein heats internal portions of a fuel cell using a heating medium from a fuel processor. The heating medium may comprise gases exhausted at high temperatures from the fuel processor, which are then transported to the fuel cell. The heating medium may also include a gas that reacts catalytically in the fuel cell to produce heat. When the gases include methanol for example, a catalyst in the fuel cell facilitates production of heat using the methanol. Similarly, a catalyst in the fuel cell may be employed to facilitate heat production using hydrogen output from the reformer and provided to the fuel cell. Heating a fuel cell in this manner allows fuel cell operating temperatures to be reached sooner during fuel cell warm-up periods, and permits elevated operating temperatures to be maintained when electrical energy is not being generated by the fuel cell.

Systems and methods for expediting fuel cell system start up are provided. The systems use electrical heat to expedite start up time before operating temperatures are reached.

Methods for shutting down a fuel cell system are also described that reduce the amount of moisture and gases in the reformer and in one or more fuel cell components at shut down.

One hydrogen efficient fuel cell system described herein transports hydrogen to an inlet of a burner. The hydrogen may comprise unused hydrogen from a fuel cell and/or hydrogen produced in a reformer. The burner comprises a catalyst that facilitates production of heat in the presence of the hydrogen.

In one aspect, the present invention relates to a fuel cell system for producing electrical energy. The fuel cell system comprises a fuel processor and a fuel cell. The fuel processor includes a reformer configured to receive a fuel source, configured to output hydrogen, and including a catalyst that facilitates the production of hydrogen. The fuel processor also includes a burner configured to provide heat to the reformer. The fuel cell comprises a fuel cell stack configured to produce electrical energy using hydrogen output by the fuel processor. The fuel cell also comprises a heat transfer appendage that a) includes a portion arranged external to the fuel cell stack and b) is in conductive thermal communication with an internal portion of the fuel cell stack. The fuel cell system also comprises plumbing configured to transport a heating medium from the fuel processor to the fuel cell.

In another aspect, the present invention relates to a method for generating electrical energy in a fuel cell that receives hydrogen from a fuel processor. The fuel processor is configured to process a fuel source to produce the hydrogen. The method comprises providing the fuel source to the fuel processor. The method also comprises transporting a heating medium from the fuel processor to the fuel cell when electrical energy output by the fuel cell includes less than an electrical threshold or when temperature of a component in the fuel cell is less than a temperature threshold. The method further comprises heating a portion of the fuel cell. The method additionally comprises transporting hydrogen from the fuel processor to the fuel cell. The method also comprises detecting temperature of the component or electrical output of the fuel cell. The method further comprises generating electrical energy in the fuel cell when the temperature of the component is about equal to or greater than the threshold temperature or when electrical energy output by the fuel cell is about equal to or greater than an electrical threshold.

In yet another aspect, the present invention relates to a method for shutting down a fuel cell system comprising a fuel cell that received hydrogen from a fuel processor. The fuel processor includes a reformer and a burner that provided heat to the reformer. The method comprises stopping electrical energy generation in the fuel cell. The method also comprises discontinuing a supply of a fuel source to the reformer, which is configured to receive the fuel source and output hydrogen. The method further comprises generating heat in the burner to heat to the reformer after discontinuing the supply of the fuel source to the reformer. The method additionally comprises discontinuing heat generation in the burner. The method also comprises flushing the burner with air.

In still another aspect, the present invention relates to a fuel cell system for producing electrical energy. The fuel cell system comprises a fuel processor and a burner. The fuel processor includes a reformer configured to receive a fuel source, configured to output hydrogen, and including a catalyst that facilitates the production of hydrogen. The fuel processor also includes a burner configured to provide heat to the reformer. The fuel cell is configured to receive hydrogen produced in the reformer and configured to produce electrical energy using the hydrogen. The fuel cell system also comprises plumbing configured to transport hydrogen to the burner.

In another aspect, the present invention relates to a fuel cell system for producing electrical energy. The fuel cell system comprises a fuel processor and a burner. The fuel processor includes a reformer configured to receive a fuel source, configured to output hydrogen, and including a catalyst that facilitates the production of hydrogen. The fuel processor also includes a burner configured to provide heat to the reformer. The fuel cell is configured to receive hydrogen produced in the reformer and configured to produce electrical energy using the hydrogen. The fuel cell system also comprises plumbing configured to transport oxygen from the fuel cell to the fuel processor.

In yet another aspect, the present invention relates to a method for starting up a fuel processor including a reformer and a burner that provides heat to the reformer. The method comprises generating heat using an electrical heater that is configured to heat the burner or a fuel source provided to the burner. The method also comprises supplying the fuel source to the burner. The method further comprises catalytically generating heat in the burner to heat the reformer. The method additionally comprises supplying the fuel source to the reformer. The method also comprises generating hydrogen in the reformer.

In still another aspect, the present invention relates to a system for heating a fuel source before catalytic heat generation within a burner included in a fuel processor. The system comprises a reformer configured to receive the fuel source, configured to output hydrogen, and including a catalyst that facilitates the production of hydrogen. The system also comprises a burner configured to provide heat to the reformer. The system comprises an electric heater configured to heat the burner or the fuel source provided to the burner.

In another aspect, the present invention relates to a fuel cell system for producing electrical energy. The fuel cell system comprises a fuel processor. The fuel processor includes a reformer configured to receive a fuel source, configured to output hydrogen, and including a catalyst that facilitates the production of hydrogen. The fuel processor also includes a burner configured to provide heat to the reformer. The fuel cell comprises a fuel cell stack configured to produce electrical energy using hydrogen output by the fuel processor. The fuel cell also comprises a heat transfer appendage that a) includes a portion arranged external to the fuel cell stack and b) is in conductive thermal communication with an internal portion of the fuel cell stack. The fuel cell system also comprises plumbing configured to transport a heating medium or a cooling medium between the fuel processor and the fuel cell.

In still another aspect, the present invention relates to a fuel cell system for producing electrical energy. The fuel cell system comprises a fuel processor. The fuel processor includes a reformer configured to receive a fuel source, configured to output hydrogen, and including a catalyst that facilitates the production of hydrogen. The fuel processor also includes a burner configured to provide heat to the reformer. The fuel cell comprises a fuel cell stack configured to produce electrical energy using hydrogen output by the fuel processor. The fuel cell also comprises a heat transfer appendage that a) includes a portion arranged external to the fuel cell stack and b) is in conductive thermal communication with an internal portion of the fuel cell stack. The fuel cell system also comprises control logic configured to regulate heat transfer or temperature for one or more components within the fuel cell system.

These and other features and advantages of the present invention will be described in the following description of the invention and associated figures.

BRIEF DESCRIPTION OF THE DRAWINGS

FIG. 3A illustrates a cross-sectional side view of a fuel processor used in the fuel cell system of FIG. 1A in accordance with one embodiment of the present invention.

FIG. 3B illustrates a cross-sectional front view of the fuel processor used in the fuel cell system of FIG. 1A taken through a mid-plane of fuel processor.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Fuel Cell System

Figure 1A:
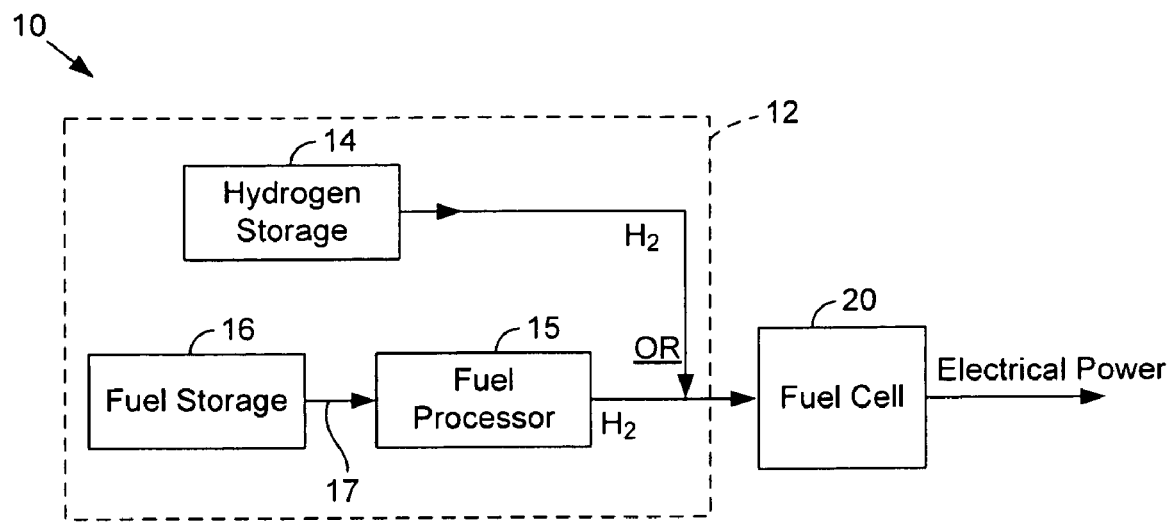
FIG. 1A illustrates a fuel cell system for producing electrical energy in accordance with one embodiment of the present invention.

FIG. 1A illustrates a fuel cell system 10 for producing electrical energy in accordance with one embodiment of the present invention. Fuel cell system 10 comprises a hydrogen fuel supply 12 and a fuel cell 20.

Hydrogen supply 12 provides hydrogen to fuel cell 20. As shown, supply 12 includes a 'reformed' hydrogen supply that processes a fuel source to produce hydrogen. Fuel source 17 acts as a carrier for hydrogen and can be processed to separate hydrogen. Fuel source 17 may include any hydrogen bearing fuel stream, hydrocarbon fuel or other hydrogen fuel source such as ammonia. Currently available hydrocarbon fuel sources 17 suitable for use with the present invention include methanol, ethanol, gasoline, propane, butane and natural gas, for example. Several hydrocarbon and ammonia products may also produce a suitable fuel source 17. Liquid fuel sources 17 offer high energy densities and the ability to be readily stored and shipped. Storage device 16 may contain a fuel mixture. When the fuel processor 15 comprises a steam reformer, storage device 16 may contain a fuel mixture of a hydrocarbon fuel source and water. Hydrocarbon fuel source/water fuel mixtures are frequently represented as a percentage fuel source in water. In one embodiment, fuel source 17 comprises methanol or ethanol concentrations in water in the range of 1%-99.9%. Other liquid fuels such as butane, propane, gasoline, military grade "JP8" etc. may also be contained in storage device 16 with concentrations in water from 5-100%. In a specific embodiment, fuel source 17 comprises 67% methanol by volume.

As shown, the reformed hydrogen supply comprises a fuel processor 15 and a fuel source storage device 16. Storage device 16 stores fuel source 17, and may comprise a portable and/or disposable fuel cartridge. A disposable cartridge offers a user instant recharging. In one embodiment, the cartridge includes a collapsible bladder within a hard plastic case. A separate fuel pump typically controls fuel source 17 flow from storage device 16. If system 10 is load following, then a control system meters fuel source 17 to deliver fuel source 17 to processor 15 at a flow rate determined by the required power level output of fuel cell 20.

Fuel processor 15 processes the hydrocarbon fuel source 17 and outputs hydrogen. A hydrocarbon fuel processor 15 heats and processes a hydrocarbon fuel source 17 in the presence of a catalyst to produce hydrogen. Fuel processor 15 comprises a reformer, which is a catalytic device that converts a liquid or gaseous hydrocarbon fuel source 17 into hydrogen and carbon dioxide. As the term is used herein, reforming refers to the process of producing hydrogen from a fuel source. Fuel processor 15 is described in further detail below.

Fuel cell 20 electrochemically converts hydrogen and oxygen to water, generating electrical energy and heat in the process. Ambient air commonly supplies oxygen for fuel cell 20. A pure or direct oxygen source may also be used for oxygen supply. The water often forms as a vapor, depending on the temperature of fuel cell 20 components. The electrochemical reaction also produces carbon dioxide as a byproduct for many fuel cells.

In one embodiment, fuel cell 20 is a low volume ion conductive membrane (PEM) fuel cell suitable for use with portable applications such as consumer electronics. A ion conductive membrane fuel cell comprises a membrane electrode assembly that carries out the electrical energy generating electrochemical reaction. The membrane electrode assembly includes a hydrogen catalyst, an oxygen catalyst and a ion conductive membrane that a) selectively conducts protons and b) electrically isolates the hydrogen catalyst from the oxygen catalyst. A hydrogen gas distribution layer contains the hydrogen catalyst and allows the diffusion of hydrogen therethrough. An oxygen gas distribution layer contains the oxygen catalyst and allows the diffusion of oxygen and hydrogen protons therethrough. The ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

A PEM fuel cell often includes a fuel cell stack having a set of bi-polar plates. A membrane electrode assembly is disposed between two bi-polar plates. Hydrogen distribution 43 occurs via a channel field on one plate while oxygen distribution 45 occurs via a channel field on a second facing plate. Specifically, a first channel field distributes hydrogen to the hydrogen gas distribution layer, while a second channel field distributes oxygen to the oxygen gas distribution layer. The 'term 'bi-polar' refers electrically to a bi-polar plate (whether comprised of one plate or two plates) sandwiched between two membrane electrode assembly layers. In this case, the bi-polar plate acts as both a negative terminal for one adjacent membrane electrode assembly and a positive terminal for a second adjacent membrane electrode assembly arranged on the opposite face of the bi-polar plate.

In electrical terms, the anode includes the hydrogen gas distribution layer, hydrogen catalyst and bi-polar plate. The anode acts as the negative electrode for fuel cell 20 and conducts electrons that are freed from hydrogen molecules so that they can be used externally, e.g., to power an external circuit. In a fuel cell stack, the bi-polar plates are connected in series to add the potential gained in each layer of the stack. In electrical terms, the cathode includes the oxygen gas distribution layer, oxygen catalyst and bi-polar plate. The cathode represents the positive electrode for fuel cell 20 and conducts the electrons back from the external electrical circuit to the oxygen catalyst, where they can recombine with hydrogen ions and oxygen to form water.

The hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder very thinly coated onto a carbon paper or cloth. Many designs employ a rough and porous catalyst to increase surface area of the platinum exposed to the hydrogen and oxygen.

In one embodiment, fuel cell 20 comprises a set of bi-polar plates formed from a single plate. Each plate includes channel fields on opposite faces of the plate. The single bi-polar plate thus dually distributes hydrogen and oxygen: one channel field distributes hydrogen while a channel field on the opposite face distributes oxygen. Multiple bi-polar plates can be stacked to produce a 'fuel cell stack' in which a membrane electrode assembly is disposed between each pair of adjacent bi-polar plates.

Since the electrical generation process in fuel cell 20 is exothermic, fuel cell 20 may implement a thermal management system to dissipate heat from the fuel cell. Fuel cell 20 may also employ a number of humidification plates (HP) to manage moisture levels in the fuel cell. Further description of a fuel cell suitable for use with the present invention is included in commonly owned co-pending patent application entitled "Micro Fuel Cell Architecture" naming Ian Kaye as inventor and filed on the same day as this patent application, which is incorporated by reference for all purposes.

While the present invention will mainly be discussed with respect to PEM fuel cells, it is understood that the present invention may be practiced with other fuel cell architectures. The main difference between fuel cell architectures is the type of ion conductive membrane used. In one embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may benefit from one or more systems and controls improvements described herein. Other such fuel cell architectures include direct methanol, alkaline and molten carbonate fuel cells.

Fuel cell 20 generates dc voltage that may be used in a wide variety of applications. For example, electrical energy generated by fuel cell 20 may be used to power a motor or light. In one embodiment, the present invention provides 'small' fuel cells that are configured to output less than 200 watts of power (net or total). Fuel cells of this size are commonly referred to as 'micro fuel cells' and are well suited for use with portable electronics devices. In one embodiment, fuel cell 20 is configured to generate from about 1 milliwatt to about 200 watts. In another embodiment, fuel cell 20 generates from about 3 W to about 20 W. Fuel cell 20 may also be a stand-alone fuel cell, which is a single unit that produces power as long as it has an a) oxygen and b) hydrogen or a hydrocarbon fuel supply. A stand-alone fuel cell 20 that outputs from about 40 W to about 100 W is well suited for use in a laptop computer.

In one embodiment, fuel processor 15 is a steam reformer that only needs steam to produce hydrogen. Several types of reformers suitable for use in fuel cell system 10 include steam reformers, auto thermal reformers (ATR) or catalytic partial oxidizers (CPOX). ATR and CPOX reformers mix air with the fuel and steam mix. ATR and CPOX systems reform fuels such as methanol, diesel, regular unleaded gasoline and other hydrocarbons. In a specific embodiment, storage device 16 provides methanol 17 to fuel processor 15, which reforms the methanol at about 250° C. or less and allows fuel cell system 10 use in applications where temperature is to be minimized.

Figure 1B:
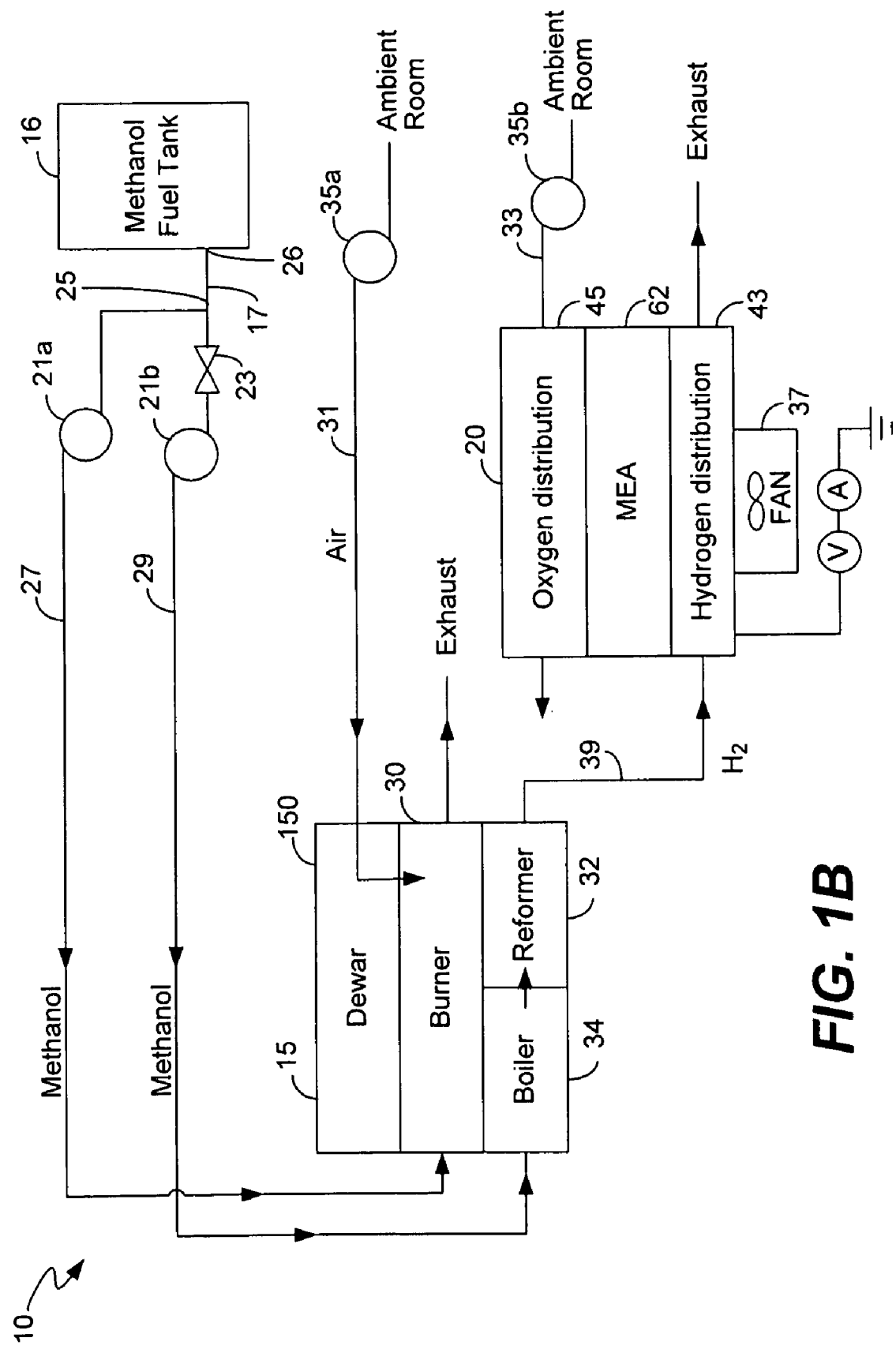
FIG. 1B illustrates schematic operation for the fuel cell system of FIG. 1A in accordance with a specific embodiment of the present invention.

FIG. 1B illustrates schematic operation for fuel cell system 10 in accordance with a specific embodiment of the present invention. As shown, fuel cell system 10 comprises fuel container 16, hydrogen fuel source 17, fuel processor 15, fuel cell 20, multiple pumps 21 and fans 35, fuel lines and gas lines, and one or more valves 23.

Fuel container 16 stores methanol as a hydrogen fuel source 17. An outlet 26 of fuel container 16 provides methanol 17 into hydrogen fuel source line 25. As shown, line 25 divides into two lines: a first line 27 that transports methanol 17 to a burner 30 for fuel processor 15 and a second line 29 that transports methanol 17 to reformer 32 in fuel processor 15. Lines 25, 27 and 29 may comprise plastic tubing, for example. Separate pumps 21a and 21b are provided for lines 27 and 29, respectively, to pressurize the lines and transmit the fuel source at independent rates if desired. A model P625 pump as provided by Instech of Plymouth Meeting, Pa. is suitable to transmit liquid methanol for system 10 is suitable in this embodiment. A flow sensor or valve 23 situated on line 29 between storage device 16 and fuel processor 18 detects and communicates the amount of methanol 17 transfer between storage device 16 and reformer 32. In conjunction with the sensor or valve 23 and suitable control, such as digital control applied by a processor that implements instructions from stored software, pump 21b regulates methanol 17 provision from storage device 16 to reformer 32.

Fan 35a delivers oxygen and air from the ambient room through line 31 to regenerator 36 of fuel processor 15. Fan 35b delivers oxygen and air from the ambient room through line 33 to regenerator 36 of fuel processor 15. In this embodiment, a model AD2005DX-K70 fan as provided by Adda USA of California is suitable to transmit oxygen and air for fuel cell system 10. A fan 37 blows cooling air over fuel cell 20 and its heat transfer appendages 46.

Fuel processor 15 receives methanol 17 from storage device 16 and outputs hydrogen. Fuel processor 15 comprises burner 30, reformer 32, boiler 34 and dewar 150. Burner 30 includes an inlet that receives methanol 17 from line 27 and a catalyst that generates heat with methanol presence. Boiler 34 includes an inlet that receives methanol 17 from line 29. The structure of boiler 34 permits heat produced in burner 30 to heat methanol 17 in boiler 34 before reformer 32 receives the methanol 17. Boiler 34 includes an outlet that provides heated methanol 17 to reformer 32. Reformer 32 includes an inlet that receives heated methanol 17 from boiler 34. A catalyst in reformer 32 reacts with the methanol 17 and produces hydrogen and carbon dioxide. This reaction is slightly endothermic and draws heat from burner 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium or platinum, that is preferential to carbon monoxide over carbon dioxide.

Dewar 150 pre-heats air before the air enters burner 30. Dewar 150 also reduces heat loss from fuel cell 20 by heating the incoming air before it escapes fuel process 15. In one sense, dewar 150 acts as a regenerator that uses waste heat in fuel processor 15 to increase thermal management and thermal efficiency of the fuel processor. Specifically, waste heat from burner 30 may be used to pre-heat incoming air provided to burner 30 to reduce heat transfer to the air in the burner so more heat transfers to reformer 32.

Line 39 transports hydrogen from fuel processor 15 to fuel cell 20. Gaseous delivery lines 31, 33 and 39 may comprise plastic tubing, for example. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes an hydrogen inlet port that receives hydrogen from line 39 and delivers it to a hydrogen intake manifold for delivery to one or more bi-polar plates and their hydrogen distribution channels. An oxygen inlet port of fuel cell 20 receives oxygen from line 33 and delivers it to an oxygen intake manifold for delivery to one or more bi-polar plates and their oxygen distribution channels. An anode exhaust manifold collects gases from the hydrogen distribution channels and delivers them to an anode exhaust port, which outlets the exhaust gases into the ambient room. A cathode exhaust manifold collects gases from the oxygen distribution channels and delivers them to a cathode exhaust port.

In addition to the components shown in shown in FIG. 1B, system 10 may also include other elements such as electronic controls, additional pumps and valves, added system sensors, manifolds, heat exchangers and electrical interconnects useful for carrying out functionality of a fuel cell system 10 that are known to one of skill in the art and omitted herein for sake of brevity.

2. Fuel Cell

Figure 2A:
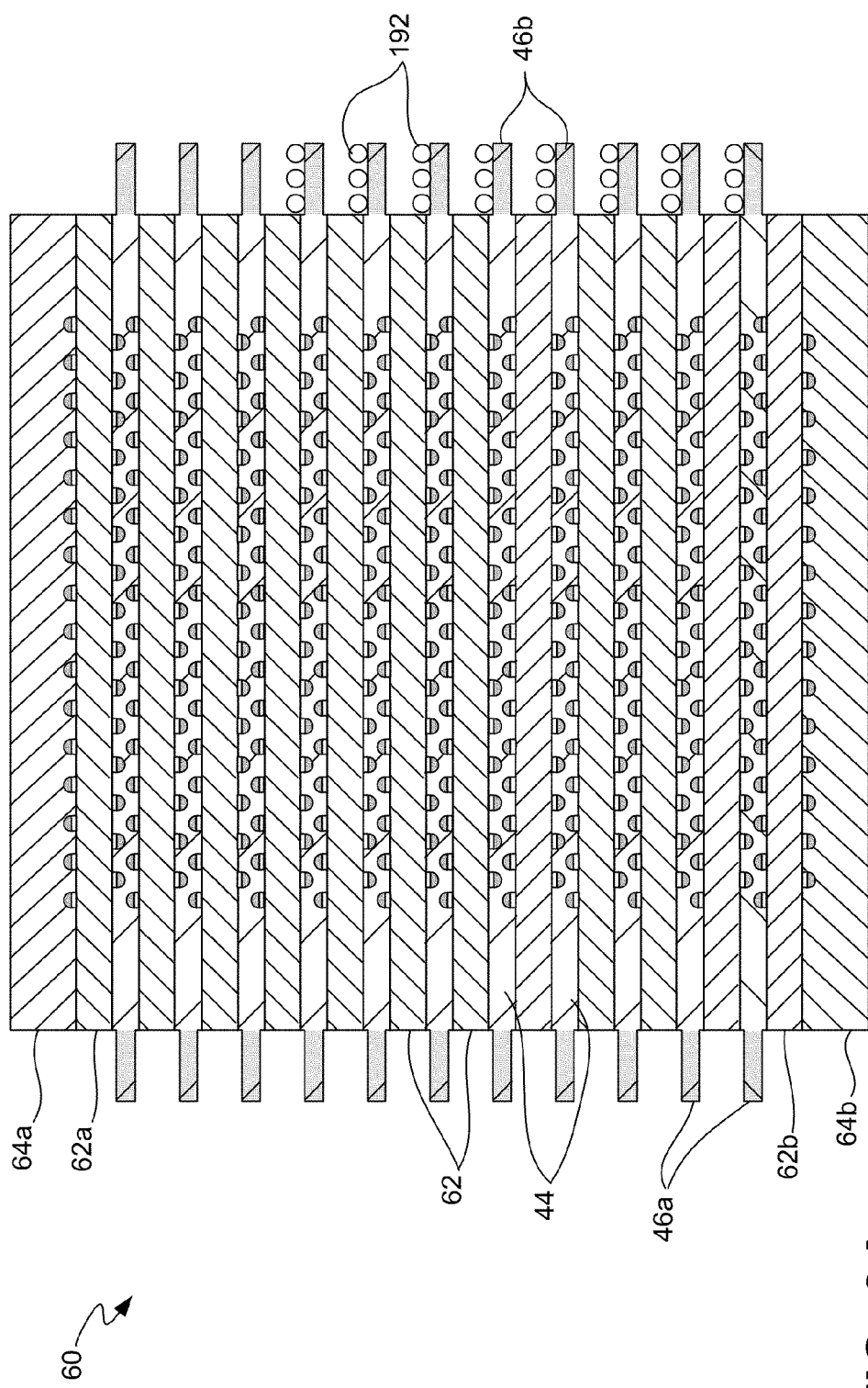
FIG. 2A illustrates a cross sectional view of a fuel cell stack for use in the fuel cell of FIG. 1A in accordance with one embodiment of the present invention.
Figure 2B:
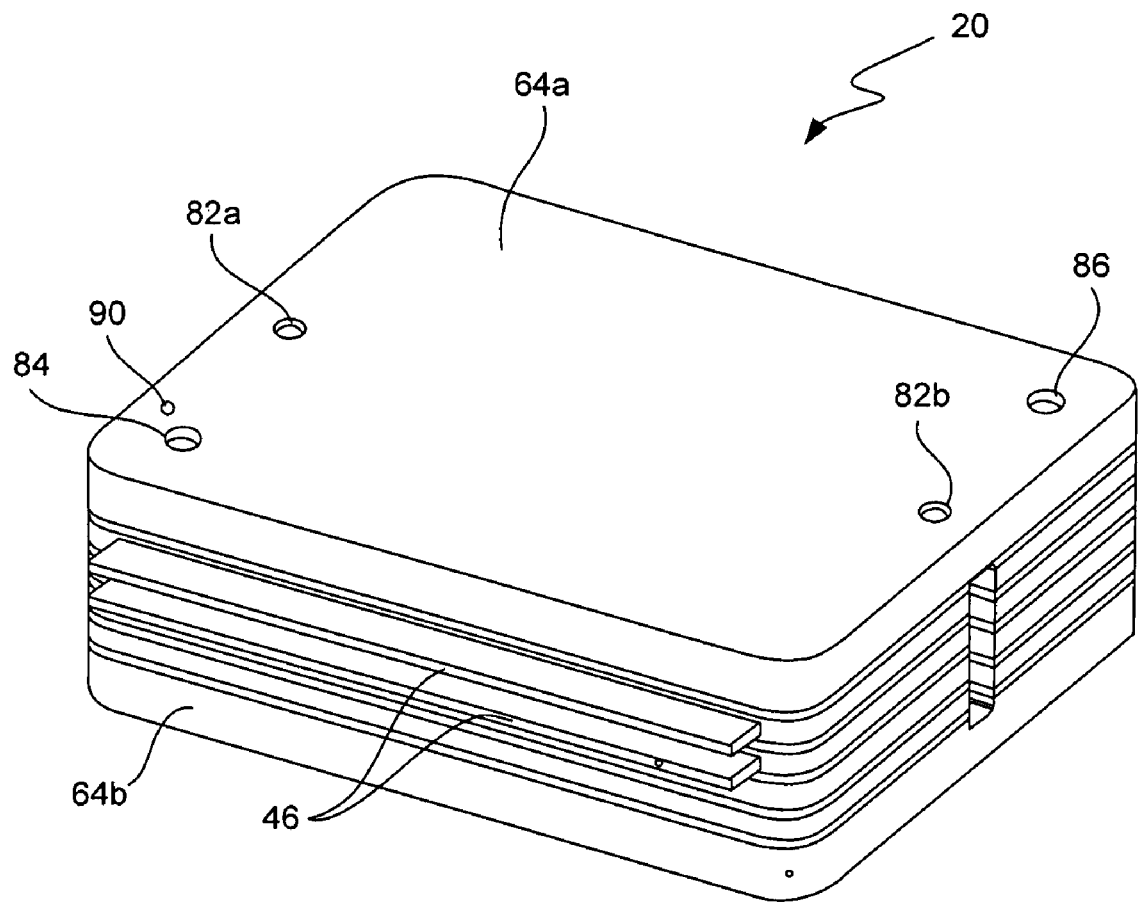
FIG. 2B illustrates an outer top perspective view of a fuel cell stack and fuel cell in accordance with another embodiment of the present invention.

FIG. 2A illustrates a cross sectional view of a fuel cell stack 60 for use in fuel cell 20 in accordance with one embodiment of the present invention. FIG. 2B illustrates an outer top perspective view of a fuel cell stack 60 and fuel cell 20 in accordance with another embodiment of the present invention.

Referring initially to FIG. 2A, fuel cell stack 60 is a bi-polar plate stack that comprises a set of bi-polar plates 44 and a set of membrane electrode assembly (MEA) layers 62. Two MEA layers 62 neighbor each bi-polar plate 44. With the exception of topmost and bottommost membrane electrode assembly layers 62a and 62b, each MEA 62 is disposed between two adjacent bi-polar plates 44. For MEAs 62a and 62b, top and bottom end plates 64a and 64b include a channel field 72 on the face neighboring an MEA 62.

The bi-polar plates 44 in stack 60 also each include two heat transfer appendages 46. More specifically, each bi-polar plate 44 includes a heat transfer appendage 46a on one side of the plate and a heat transfer appendage 46b on the opposite side. Heat transfer appendages 46 are discussed in further detail below.

As shown, stack 60 includes twelve membrane electrode assembly layers 62, eleven bi-polar plates 44 and two end plates 64. The number of bi-polar plates 44 and MEA layers 62 in each set may vary with design of fuel cell stack 60. Stacking parallel layers in fuel cell stack 60 permits efficient use of space and increased power density for fuel cell 20. In one embodiment, each membrane electrode assembly 62 produces 0.7 V and the number of MEA layers 62 is selected to achieve a desired voltage. Alternatively, the number of MEA layers 62 and bi-polar plates 44 may be determined by the allowable thickness in an electronics device. A fuel cell stack 60 having from one MEA 62 to several hundred MEAs 62 is suitable for many applications. A stack 60 having from about three MEAs 62 to about twenty MEAs 62 is also suitable for numerous applications. Fuel cell 20 size and layout may also be tailored and configured to output a given power.

Referring to FIG. 2B, top and bottom end plates 64a and 64b provide mechanical protection for stack 60. End plates 64 also hold the bi-polar plates 44 and MEA layers 62 together, and apply pressure across the planar area of each bi-polar plate 44 and each MEA 62. Bolts 82a and 82b connect and secure top and bottom end plates 64a and 64b together.

Fuel cell 20 includes two anode ports that open to the outside of fuel cell stack 60: an inlet anode port or inlet hydrogen port 84, and an outlet anode port or outlet hydrogen port 86. Inlet hydrogen port 84 is disposed on top end plate 64a, couples with an inlet line to receive hydrogen gas, and opens to an inlet hydrogen manifold 102 (see FIG. 2D) that is configured to deliver inlet hydrogen gas to a channel field 72 on each bi-polar plate 44 in stack 60. Outlet port 86 receives outlet gases from an anode exhaust manifold 104 (see FIG. 2D) that is configured to collect waste products from the anode channel fields 72 of each bi-polar plate 44. Outlet port 86 may provide the exhaust gases to the ambient space about the fuel cell output the gases to a line that couples to port 86 for transportation of the anode exhaust gases as described below.

Fuel cell 20 includes two cathode ports: an inlet cathode port or inlet oxygen port 88, and an outlet cathode port or outlet water/vapor port 90. Inlet oxygen port 88 is disposed on bottom end plate 64b (see FIG. 2A), couples with an inlet line to receive ambient air, and opens to an oxygen manifold 106 that is configured to deliver inlet oxygen and ambient air to a channel field 72 on each bi-polar plate 44 in stack 60. Outlet water/vapor port 90 receives outlet gases from a cathode exhaust manifold 108 (see FIG. 2D) that is configured to collect water (typically as a vapor) from the cathode channel fields 72 on each bi-polar plate 44.

Figure 2C:
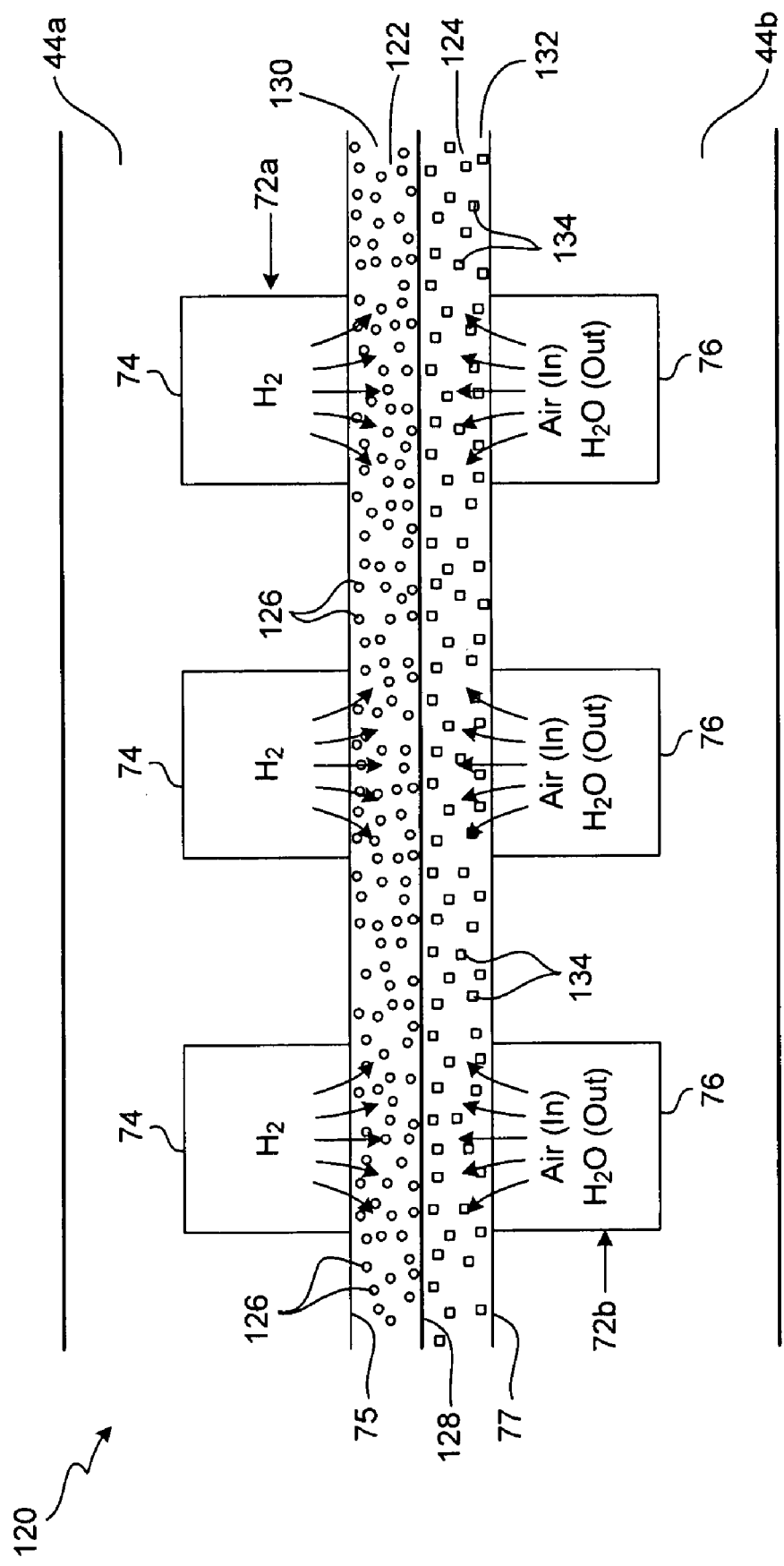
FIG. 2C illustrates an ion conductive membrane fuel cell (PEMFC) architecture for the fuel cell of FIG. 1A in accordance with one embodiment of the present invention.

FIG. 2C illustrates a ion conductive membrane fuel cell (PEMFC) architecture 120 for use in fuel cell 20 in accordance with one embodiment of the present invention. As shown, PEMFC architecture 120 comprises two bi-polar plates 44 and a membrane electrode assembly layer (or MEA) 62 sandwiched between the two bi-polar plates 44. The MEA 62 electrochemically converts hydrogen and oxygen to water, generating electrical energy and heat in the process. Membrane electrode assembly 62 includes an anode gas diffusion layer 122, a cathode gas diffusion layer 124, a hydrogen catalyst 126, ion conductive membrane 128, anode electrode 130, cathode electrode 132, and oxygen catalyst 134.

Pressurized hydrogen gas (H2) enters fuel cell 20 via hydrogen port 84, proceeds through inlet hydrogen manifold 102 and through hydrogen channels 74 of a hydrogen channel field 72a disposed on the anode face 75 of bi-polar plate 44a. The hydrogen channels 74 open to anode gas diffusion layer 122, which is disposed between the anode face 75 of bi-polar plate 44a and ion conductive membrane 128. The pressure forces hydrogen gas into the hydrogen-permeable anode gas diffusion layer 122 and across the hydrogen catalyst 126, which is disposed in the anode gas diffusion layer 122. When an H2 molecule contacts hydrogen catalyst 126, it splits into two H+ ions (protons) and two electrons (e−). The protons move through the ion conductive membrane 128 to combine with oxygen in cathode gas diffusion layer 124. The electrons conduct through the anode electrode 130, where they build potential for use in an external circuit (e.g., a power supply of a laptop computer) After external use, the electrons flow to the cathode electrode 132 of PEMFC architecture 120.

Hydrogen catalyst 126 breaks hydrogen into protons and electrons. Suitable catalysts 126 include platinum, ruthenium, and platinum black or platinum carbon, and/or platinum on carbon nanotubes, for example. Anode gas diffusion layer 122 comprises any material that allows the diffusion of hydrogen therethrough and is capable of holding the hydrogen catalyst 126 to allow interaction between the catalyst and hydrogen molecules. One such suitable layer comprises a woven or non-woven carbon paper. Other suitable gas diffusion layer 122 materials may comprise a silicon carbide matrix and a mixture of a woven or non-woven carbon paper and Teflon.

On the cathode side of PEMFC architecture 120, pressurized air carrying oxygen gas (O2) enters fuel cell 20 via oxygen port 88, proceeds through inlet oxygen manifold 106, and through oxygen channels 76 of an oxygen channel field 72b disposed on the cathode face 77 of bi-polar plate 44b. The oxygen channels 76 open to cathode gas diffusion layer 124, which is disposed between the cathode face 77 of bi-polar plate 44b and ion conductive membrane 128. The pressure forces oxygen into cathode gas diffusion layer 124 and across the oxygen catalyst 134 disposed in the cathode gas diffusion layer 124. When an 02 molecule contacts oxygen catalyst 134, it splits into two oxygen atoms. Two H+ ions that have traveled through the ion selective ion conductive membrane 128 and an oxygen atom combine with two electrons returning from the external circuit to form a water molecule (H2O). Cathode channels 76 exhaust the water, which usually forms as a vapor. This reaction in a single MEA layer 62 produces about 0.7 volts.

Cathode gas diffusion layer 124 comprises a material that permits diffusion of oxygen and hydrogen protons therethrough and is capable of holding the oxygen catalyst 134 to allow interaction between the catalyst 134 with oxygen and hydrogen. Suitable gas diffusion layers 124 may comprise carbon paper or cloth, for example. Other suitable gas diffusion layer 124 materials may comprise a silicon carbide matrix and a mixture of a woven or non-woven carbon paper and Teflon. Oxygen catalyst 134 facilitates the reaction of oxygen and hydrogen to form water. One common catalyst 134 comprises platinum. Many designs employ a rough and porous catalyst 134 to increase surface area of catalyst 134 exposed to the hydrogen or oxygen. For example, the platinum may reside as a powder very thinly coated onto a carbon paper or cloth cathode gas diffusion layer 124.

Ion conductive membrane 128 electrically isolates the anode from the cathode by blocking electrons from passing through membrane 128. Thus, membrane 128 prevents the passage of electrons between gas diffusion layer 122 and gas diffusion layer 124. Ion conductive membrane 128 also selectively conducts positively charged ions, e.g., hydrogen protons from gas diffusion layer 122 to gas diffusion layer 124. For fuel cell 20, protons move through membrane 128 and electrons are conducted away to an electrical load or battery. In one embodiment, ion conductive membrane 128 comprises an electrolyte. One electrolyte suitable for use with fuel cell 20 is Celtec 1000 from PEMEAS USA AG of Murray Hill, N.J. (www.pemeas.com). Fuel cells 20 including this electrolyte are generally more carbon monoxide tolerant and may not require humidification. Ion conductive membrane 128 may also employ a phosphoric acid matrix that includes a porous separator impregnated with phosphoric acid. Alternative ion conductive membranes 128 suitable for use with fuel cell 20 are widely available from companies such as United technologies, DuPont, 3M, and other manufacturers known to those of skill in the art. For example, WL Gore Associates of Elkton, Md. produces the primea Series 58, which is a low temperature MEA suitable for use with the present invention.

In one embodiment, fuel cell 20 requires no external humidifier or heat exchanger and the stack 60 only needs hydrogen and air to produce electrical power. Alternatively, fuel cell 20 may employ humidification of the cathode to fuel cell 20 improve performance. For some fuel cell stack 60 designs, humidifying the cathode increases the power and operating life of fuel cell 20.

Figure 2D:
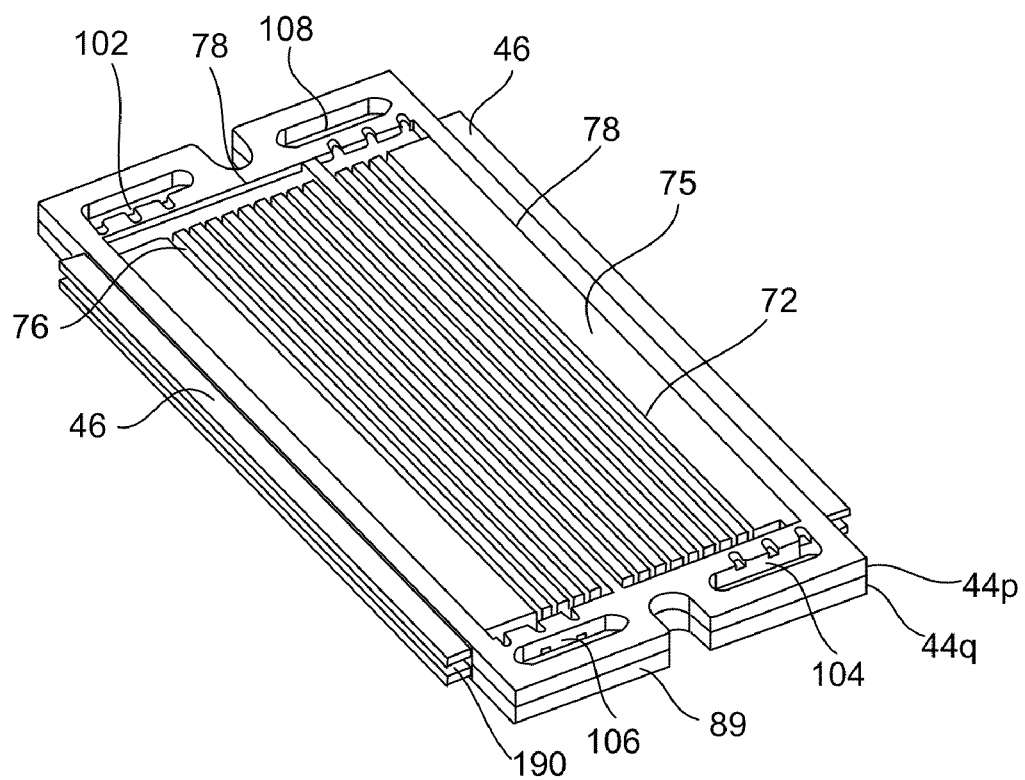
FIG. 2D illustrates a top perspective view of bi-polar plates in accordance with one embodiment of the present invention.

FIG. 2D illustrates a top perspective view of bi-polar plates 44p and 44q in accordance with one embodiment of the present invention. Bi-polar plate 44 is a single plate 44 with a first channel fields 72 disposed on opposite faces 75 of the plate 44.

Functionally, bi-polar plate 44 a) delivers and distributes reactant gasses to the gas diffusion layers 122 and 124 and their respective catalysts, b) maintains separation of the reactant gasses from one another between MEA layers 62 in stack 60, c) exhausts electrochemical reaction byproducts from MEA layers 62, d) facilitates heat transfer to and/or from MEA layers 62 and fuel cell stack 60, and e) includes gas intake and gas exhaust manifolds for gas delivery to other bi-polar plates 44 in the fuel stack 60.

Structurally, bi-polar plate 44 has a relatively flat profile and includes opposing top and bottom faces 75a and 75b (only top face 75a is shown) and a number of sides 78. Faces 75 are substantially planar with the exception of channels 76 formed as troughs into substrate 89. Sides 78 comprise portions of bi-polar plate 44 proximate to edges of bi-polar plate 44 between the two faces 75. As shown, bi-polar plate 44 is roughly quadrilateral with features for the intake manifolds, exhaust manifolds and heat transfer appendage 46 that provide deviation from the quadrilateral shape.

The manifold on each plate 44 is configured to deliver a gas to a channel field on a face of the plate 44 or receive a gas from the channel field 72. The manifolds for bi-polar plate 44 include apertures or holes in substrate 89 that, when combined with manifolds of other plates 44 in a stack 60, form an inter-plate 44 gaseous communication manifold (such as 102, 104, 106 and 108). Thus, when plates 44 are stacked and their manifolds substantially align, the manifolds permit gaseous delivery to and from each plate 44.

Bi-polar plate 44 includes a channel field 72 or "flow field" on each face of plate 44. Each channel field 72 includes one or more channels 76 formed into the substrate 89 of plate 44 such that the channel rests below the surface of plate 44. Each channel field 72 distributes one or more reactant gasses to an active area for the fuel cell stack 60. Bi-polar plate 44 includes a first channel field 72a on the anode face 75a of bi-polar plate 44 that distributes hydrogen to an anode (FIG. 2C), while a second channel field on opposite cathode face 75b distributes oxygen to a cathode. Specifically, channel field 72a includes multiple channels 76 that permit oxygen and air flow to anode gas diffusion layer 122, while channel field 72b includes multiple channels 76 that permit oxygen and air flow to cathode gas diffusion layer 124. For fuel cell stack 60, each channel field 72 is configured to receive a reactant gas from an intake manifold 102 or 106 and configured to distribute the reactant gas to a gas diffusion layer 122 or 124. Each channel field 72 also collects reaction byproducts for exhaust from fuel cell 20. When bi-polar plates 44 are stacked together in fuel cell 60, adjacent plates 44 sandwich an MEA layer 62 such that the anode face 75a from one bi-polar plate 44 neighbors a cathode face 75b of an adjacent bi-polar plate 44 on an opposite side of the MEA layer 62.

Bi-polar plate 44 may include one or more heat transfer appendages 46. Heat transfer appendage 46 permits external thermal management of internal portions of fuel cell stack 60. More specifically, appendage 46 may be used to heat or cool internal portions of fuel cell stack 60 such as internal portions of each attached bi-polar plate 44 and any neighboring MEA layers 62, for example. Heat transfer appendage 46 is laterally arranged outside channel field 72. In one embodiment, appendage 46 is disposed on an external portion of bi-polar plate 44. External portions of bi-polar plate 44 include any portions of plate 44 proximate to a side or edge of the substrate included in plate 44. External portions of bi-polar plate 44 typically do not include a channel field 72. For the embodiment shown, heat transfer appendage 46 substantially spans a side of plate 44 that does not include intake and output manifolds 102-108. For the embodiment shown in FIG. 2A, plate 44 includes two heat transfer appendages 46 that substantially span both sides of plate 44 that do not include a gas manifold.

Peripherally disposing heat transfer appendage 46 allows heat transfer between inner portions of plate 44 and the externally disposed appendage 46 via the plate substrate 89. Conductive thermal communication refers to heat transfer between bodies that are in contact or that are integrally formed. Thus, lateral conduction of heat between external portions of plate 44 (where the heat transfer appendage 46 attaches) and central portions of bi-polar plate 44 occurs via conductive thermal communication through substrate 89. In one embodiment, heat transfer appendage 46 is integral with substrate material 89 in plate 44. Integral in this sense refers to material continuity between appendage 46 and plate 44. An integrally formed appendage 46 may be formed with plate 44 in a single molding, stamping, machining or MEMs process of a single metal sheet, for example. Integrally forming appendage 46 and plate 44 permits conductive thermal communication and heat transfer between inner portions of plate 44 and the heat transfer appendage 46 via substrate 89. In another embodiment, appendage 46 comprises a material other than that used in substrate 89 that is attached onto plate 44 and conductive thermal communication and heat transfer occurs at the junction of attachment between the two attached materials.

Heat may travel to or form the heat transfer appendage 46. In other words, appendage 46 may be employed as a heat sink or source. Thus, heat transfer appendage 46 may be used as a heat sink to cool internal portions of bi-polar plate 44 or an MEA 62. Fuel cell 20 employs a cooling medium to remove heat from appendage 46. Alternatively, heat transfer appendage 46 may be employed as a heat source to provide heat to internal portions of bi-polar plate 44 or an MEA 62. In this case, a catalyst may be disposed on appendage 46 to generate heat in response to the presence of a heating medium.

For cooling, heat transfer appendage 46 permits integral conductive heat transfer from inner portions of plate 44 to the externally disposed appendage 46. During hydrogen consumption and electrical energy production, the electrochemical reaction generates heat in each MEA 62. Since internal portions of bi-polar plate 44 are in contact with the MEA 62, a heat transfer appendage 46 on a bi-polar plate 44 thus cools an MEA 62 adjacent to the plate via a) conductive heat transfer from MEA 62 to bi-polar plate 44 and b) lateral thermal communication and conductive heat transfer from central portions of the bi-polar plate 44 in contact with the MEA 62 to the external portions of plate 44 that include appendage 46. In this case, heat transfer appendage 46 sinks heat from substrate 89 between a first channel field 72 on one face 75 of plate 44 and a second channel field 72 on the opposite face of plate 44 to heat transfer appendage 46 in a direction parallel to a face 75 of plate 44. When a fuel cell stack 60 includes multiple MEA layers 62, lateral thermal communication through each bi-polar plate 44 in this manner provides interlayer cooling of multiple MEA layers 62 in stack 60—including those layers in central portions of stack 60.

Fuel cell 20 may employ a cooling medium that passes over heat transfer appendage 46. The cooling medium receives heat from appendage 46 and removes the heat from fuel cell 20. Heat generated internal to stack 60 thus conducts through bi-polar plate 44, to appendage 46, and heats the cooling medium via convective heat transfer between the appendage 46 and cooling medium. Air is suitable for use as the cooling medium.

As shown, heat transfer appendage 46 may be configured with a thickness that is less than the thickness between opposite faces 75 of plate 44. The reduced thickness of appendages 46 on adjacent bi-polar plates 44 in the fuel cell stack 60 forms a channel 190 between adjacent appendages. Multiple adjacent bi-polar plates 44 and appendages 46 in stack form numerous channels 190. Each channel 190 permits a cooling medium or heating medium to pass therethrough and across heat transfer appendages 46. In one embodiment, fuel cell stack 60 includes a mechanical housing that encloses and protects stack 60. Walls of the housing also provide additional ducting for the cooling or heating medium by forming ducts between adjacent appendages 46 and the walls.

The cooling medium may be a gas or liquid. Heat transfer advantages gained by high conductance bi-polar plates 44 allow air to be used as a cooling medium to cool heat transfer appendages 46 and stack 60. For example, a dc-fan may be attached to an external surface of the mechanical housing. The fan moves air through a hole in the mechanical housing, through channels 190 to cool heat transfer appendages 46 and fuel cell stack 60, and out an exhaust hole or port in the mechanical housing. Fuel cell system 10 may then include active thermal controls. Increasing or decreasing coolant fan speed regulates the amount of heat removal from stack 60 and the operating temperature for stack 60. In one embodiment of an air-cooled stack 60, the coolant fan speed increases or decreases as a function of the actual cathode exit temperature, relative to a desired temperature set-point.

For heating, heat transfer appendage 46 allows integral heat transfer from the externally disposed appendage 46 to inner portions of plate 44 and any components and portions of fuel cell 20 in thermal communication with inner portions of plate 44. A heating medium passed over the heat transfer appendage 46 provides heat to the appendage. Heat convected onto the appendage 46 then conducts through the substrate 89 and into internal portions of plate 44 and stack 60, such as portions of MEA 62 and its constituent components.

In one embodiment, the heating medium comprises a heated gas having a temperature greater than that of appendage 46. As will be described below, exhaust gases from burner 30 or reformer 32 of fuel processor 15 may each include elevated temperatures that are suitable for heating one or more appendages 46.

Figure 2E:
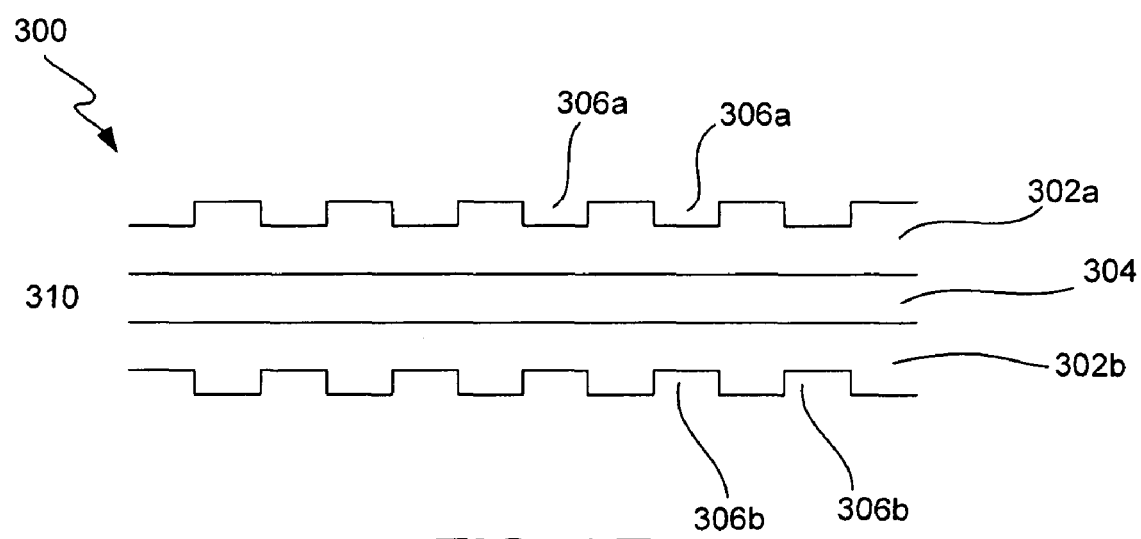
FIG. 2E illustrates a widely used and conventional bi-polar plate that comprises a plate/cooling layer/plate architecture.
Figure 2F:
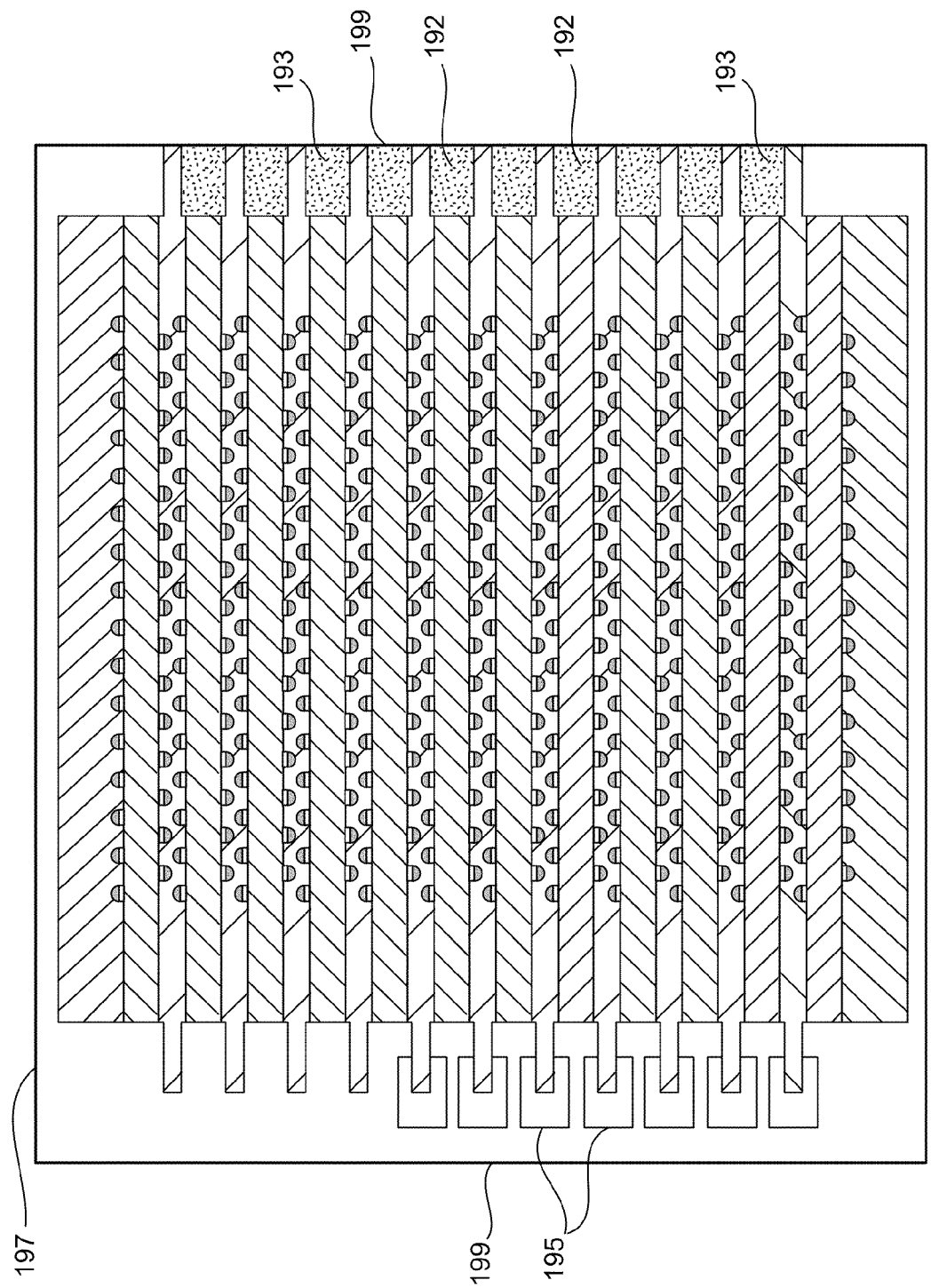
FIG. 2F illustrates a cross sectional view of a fuel cell stack for use in the fuel cell of FIG. 1A in accordance with another embodiment of the present invention.

In another embodiment, fuel cell comprises a catalyst 192 disposed in contact with, or in proximity to, a heat transfer appendage 46. The catalyst 192 generates heat when the heating medium passes over it. The heating medium in this case may comprise any gas or fluid that reacts with catalyst 192 to generate heat. Typically, catalyst 192 and the heating medium employ an exothermic chemical reaction to generate the heat. Heat transfer appendage 46 and plate 44 then transfer heat into the fuel cell stack 60, e.g. to heat internal MEA layers 62. For example, catalyst 192 may comprise platinum and the heating medium includes the hydrocarbon fuel source 17 supplied to fuel processor 15 (FIGS. 2A and 2F). The fuel source 17 may be heated to a gaseous state before it enters fuel cell 20. This allows gaseous transportation of the heating medium and gaseous interaction between the fuel source 17 and catalyst 192 to generate heat. Similar to the cooling medium described above, a fan disposed on one of the walls 199 then moves the gaseous heating medium within fuel cell 20.

In a specific embodiment, the hydrocarbon fuel source 17 used to react with catalyst 192 comes from a reformer exhaust or burner exhaust in fuel processor 15. This advantageously pre-heats the fuel source 17 before receipt within fuel cell 20 and also efficiently uses or burns any fuel remaining in the reformer or burner exhaust after processing by fuel processor 15. Alternatively, fuel cell 20 includes a separate hydrocarbon fuel source 17 feed that directly supplies hydrocarbon fuel source 17 to fuel cell 20 for heating and reaction with catalyst 192. In this case, catalyst 192 may comprise platinum. Other suitable catalysts 192 include palladium, a platinum/palladium mix, iron, ruthenium, and combinations thereof. Each of these will react with a hydrocarbon fuel source 17 to generate heat. Other suitable heating medium include hydrogen or any heated gases emitted from fuel processor 15, for example.

When hydrogen is used as the heating medium, catalyst 192 comprises a material that generates heat in the presence of hydrogen, such as palladium or platinum. As will be described in further detail below, the hydrogen may include hydrogen supplied from the reformer 32 in fuel processor 15.

As shown in FIGS. 2A and 2F, catalyst 192 is arranged on, and in contact with, each heat transfer appendage 46. In this case, the heating medium passes over each appendage 46 and reacts with catalyst 192. This generates heat, which is absorbed via conductive thermal communication by the cooler appendage 46. Wash coating may be employed to dispose catalyst 192 on each appendage 46. A ceramic support may also be used to bond catalyst 192 on an appendage 46.

FIG. 2F illustrates two examples in which a thermal catalyst 192 is disposed in proximity to heat transfer appendage 46. Proximity in this case refers to being arranged relative to heat transfer appendage 46 such that heat generated by catalyst 192 transfers to appendage 46, either by conduction, convection and/or radiation. As shown in FIG. 2F, fuel cell 20 comprises a bulkhead 195 that contains catalyst 192. Bulkhead 195 attaches to a heat transfer appendage 46 and either a) forms walls with the appendage 46 that contain catalyst 192 or b) includes its own set of wall that contain catalyst 192. Catalyst pellets 192 are then disposed in bulkhead 195. The bulkhead 195 allows the heating medium to pass over and interact with catalyst 192.

As shown in FIG. 2F, the fuel cell 20 includes a mechanical housing 197 that encloses and protects stack 60. Walls 199 of housing 197 and appendages 46 combine to form ducting 193. The inter-appendage ducting 193 permits a) catalyst 192 to be packed into the ducting 193 and b) permits the heating medium to pass through ducting 193 and over catalyst 192. In this case, catalyst 192 is packed in ducting 193 with a packing density loose enough to permit a gas to pass therethrough without encountering excessive resistance. A fan is then used to provide the heating medium into ducting 193.

For catalyst-based heating, heat then a) transfers from catalyst 192 to appendage 46, b) moves laterally though bi-polar plate 44 via conductive heat transfer from lateral portions of the plate that include heat transfer appendage 46 to central portions of bi-polar plate 44 in contact with the MEA layers 62, and c) conducts from bi-polar plate 44 to MEA layer 62. When a fuel cell stack 60 includes multiple MEA layers 62, lateral heating through each bi-polar plate 44 provides inter-layer heating of multiple MEA layers 62 in stack 60, which expedites fuel cell 20 warm up.

Bi-polar plates 44 of FIG. 2A include heat transfer appendages 46 on each side. In this case, one set of heat transfer appendages 46a is used for cooling while the other set of heat transfer appendages 46b is used for heating. Although heat transfer appendages 46 of FIG. 2F are illustrated with two different types of heating via catalyst 192 (namely, by packing into ducting 193 and storage in bulkheads 195), it is understood that fuel cell 20 need not include multiple methods of heating appendages 46 and may only include one the aforementioned techniques. In addition, while bi-polar plates 44 illustrated in FIGS. 2A and 2D show plates 44 with two heat transfer appendages 46 disposed on sides of stack 60, appendage 46 arrangements can be varied to affect and improve heat dissipation and thermal management of fuel cell stack 60 according to other specific designs. For example, one or more than two heat transfer appendages 46 may be employed on a single plate 44 to increase heat transfer between internal and external portions of plate 44. In addition, appendages 46 need not span a side of plate 44 as shown and may be tailored based on how the heating fluid is channeled through the housing 197.

Although the present invention provides a bi-polar plate 44 having channel fields 72 that distribute hydrogen and oxygen on opposing sides of a single plate 44, many embodiments described herein are suitable for use with conventional bi-polar plate assemblies that employ two separate plates for distribution of hydrogen and oxygen. FIG. 2E illustrates a widely used and conventional bi-polar plate 300 that comprises a plate/cooling layer/plate architecture.

Bi-polar plate 300 includes two plates 302a and 302b that sandwich a cooling layer 304. Top plate 302a includes a channel field 306a on its top face 308 that distributes oxygen. Bottom plate 302b includes a channel field 306b on its bottom face 308 that distributes hydrogen (or oxygen when top plate 302a distributes hydrogen). Cooling layer 304 runs a cooling medium such as de-ionized water through cooling channels 310. The cooling medium actively cools each plate 302. The cooling medium may be routed such that the temperature increase occurs in the same direction as reducing oxygen partial pressure in the cathode. Similar to bi-polar plate 44, bi-polar plate 300 is referred to as a 'bi-polar plate' since it acts electrically as a cathode for one MEA and as an anode for another MEA. Bi-polar plate 300 serves similar functions for a fuel cell as those described above for bi-polar plate 44. Top and bottom plates 302a and 302b may each comprise silicon with channels etched in their faces to provide channel fields 306.

While the present invention has mainly been discussed so far with respect to a reformed methanol fuel cell (RMFC), the present invention may also apply to other types of fuel cells, such as a solid oxide fuel cell (SOFC), a phosphoric acid fuel cell (PAFC), a direct methanol fuel cell (DMFC), or a direct ethanol fuel cell (DEFC). In this case, fuel cell 20 includes components specific to these architectures, as one of skill in the art will appreciate. A DMFC or DEFC receives and processes a fuel. More specifically, a DMFC or DEFC receives liquid methanol or ethanol, respectively, channels the fuel into the fuel cell stack 60 and processes the liquid fuel to separate hydrogen for electrical energy generation. For a DMFC, channel fields 72 in the bi-polar plates 44 distribute liquid methanol instead of hydrogen. Hydrogen catalyst 126 described above would then comprise a suitable anode catalyst for separating hydrogen from methanol. Oxygen catalyst 128 would comprise a suitable cathode catalyst for processing oxygen or another suitable oxidant used in the DMFC, such as peroxide. In general, hydrogen catalyst 126 is also commonly referred to as an anode catalyst in other fuel cell architectures and may comprise any suitable catalyst that removes hydrogen for electrical energy generation in a fuel cell, such as directly from the fuel as in a DMFC. In general, oxygen catalyst 128 may include any catalyst that processes an oxidant in used in fuel cell 20. The oxidant may include any liquid or gas that oxidizes the fuel and is not limited to oxygen gas as described above. An SOFC, PAFC or MCFC may also benefit from inventions described herein, for example. In this case, fuel cell 20 comprises an anode catalyst 126, cathode catalyst 128, anode fuel and oxidant according to a specific SOFC, PAFC or MCFC design.

3. Fuel Processor

FIG. 3A illustrates a cross-sectional side view of fuel processor 15 in accordance with one embodiment of the present invention. FIG. 3B illustrates a cross-sectional front view of fuel processor 15 taken through a mid-plane of processor 15 that also shows features of end plate 82. Fuel processor 15 reforms methanol to produce hydrogen. Fuel processor 15 comprises monolithic structure 100, end plates 182 and 184, reformer 32, burner 30, boiler 34, boiler 108, dewar 150 and housing 152. Although the present invention will now be described with respect to methanol consumption for hydrogen production, it is understood that fuel processors of the present invention may consume another fuel source, as one of skill in the art will appreciate.

As the term is used herein, 'monolithic' refers to a single and integrated structure that includes at least portions multiple components used in fuel processor 15. As shown, monolithic structure 100 includes reformer 32, burner 30, boiler 34 and boiler 108. Monolithic structure 100 may also include associated plumbing inlets and outlets for reformer 32, burner 30 and boiler 34. Monolithic structure 100 comprises a common material 141 that constitutes the structure. The monolithic structure 100 and common material 141 simplify manufacture of fuel processor 15. For example, using a metal for common material 141 allows monolithic structure 100 to be formed by extrusion. In some cases, monolithic structure 100 is consistent in cross sectional dimensions between end plates 82 and 84 and solely comprises copper formed in a single extrusion.

Housing 152 provides mechanical protection for internal components of fuel processor 15 such as burner 30 and reformer 32. Housing 152 also provides separation from the environment external to processor 15 and includes inlet and outlet ports for gaseous and liquid communication in and out of fuel processor 15. Housing 152 includes a set of housing walls 161 that at least partially contain a dewar 150 and provide external mechanical protection for components in fuel processor 15. Walls 161 may comprises a suitably stiff material such as a metal or a rigid polymer, for example. Dewar 150 improves thermal heat management for fuel processor 15 by a) allowing incoming air to be pre-heated before entering burner 30, b) dissipating heat generated by burner 32 into the incoming air before the heat reaches the outside of housing 152.

Referring to FIG. 3B, boiler 34 heats methanol before reformer 32 receives the methanol. Boiler 34 receives methanol via fuel source inlet 81, which couples to methanol supply line 27 of FIG. 1B. Since methanol reforming and hydrogen production via a catalyst 102 in reformer 32 often requires elevated methanol temperatures, fuel processor 15 pre-heats the methanol before receipt by reformer 32 via boiler 34. Boiler 34 is disposed in proximity to burner 30 to receive heat generated in burner 30. The heat transfers via conduction through monolithic structure from burner 30 to boiler 34 and via convection from boiler 34 walls to the methanol passing therethrough. In one embodiment, boiler 34 is configured to vaporize liquid methanol. Boiler 34 then passes the gaseous methanol to reformer 32 for gaseous interaction with catalyst 102.

Reformer 32 is configured to receive methanol from boiler 34. Walls 111 in monolithic structure 100 and end walls 113 on end plates 82 and 84 define dimensions for a reformer chamber 103. In one embodiment, end plate 82 and/or end plate 84 includes also channels 95 that route heated methanol exhausted from boiler 34 into reformer 32. The heated methanol then enters the reformer chamber 103 at one end of monolithic structure 100 and passes to the other end where the reformer exhaust is disposed. In another embodiment, a hole disposed in a reformer 32 wall receives inlet heated methanol from a line or other supply. The inlet hole or port may be disposed on a suitable wall 111 or 113 of reformer 32.

Reformer 32 includes a catalyst 102 that facilitates the production of hydrogen. Catalyst 102 reacts with methanol 17 and produces hydrogen gas and carbon dioxide. In one embodiment, catalyst 102 comprises pellets packed to form a porous bed or otherwise suitably filled into the volume of reformer chamber 103. Pellet diameters ranging from about 50 microns to about 1.5 millimeters are suitable for many applications. Pellet diameters ranging from about 500 microns to about 1 millimeter are suitable for use with reformer chamber 103. Pellet sizes may be varied relative to the cross sectional size of reformer chamber 103, e.g., as reformer chamber 103 increases in size so do catalyst 102 pellet diameters. Pellet sizes and packing may also be varied to control the pressure drop that occurs through reformer chamber 103. In one embodiment, pressure drops from about 0.2 to about 2 psi gauge are suitable between the inlet and outlet of reformer chamber 103. One suitable catalyst 102 may include CuZn coated onto alumina pellets when methanol is used as a hydrocarbon fuel source 17. Other materials suitable for catalyst 102 include platinum, palladium, a platinum/palladium mix, nickel, and other precious metal catalysts for example. Catalyst 102 pellets are commercially available from a number of vendors known to those of skill in the art. Catalyst 102 may also comprise catalyst materials listed above coated onto a metal sponge or metal foam. A wash coat of the desired metal catalyst material onto the walls of reformer chamber 103 may also be used for reformer 32.

Reformer 32 is configured to output hydrogen and includes an outlet port 87 that communicates hydrogen formed in reformer 32 outside of fuel processor 15. For example, a line 39 may communicate to an anode of fuel cell 20 for electrical energy generation or to a heating port for heating of a catalyst proximate to one or more heat transfer appendages. Port 87 is disposed on a wall of end plate 82 and includes a hole that passes through the wall (see FIG. 3B). The outlet hole port may be disposed on any suitable wall 111 or 113.

Hydrogen production in reformer 32 is slightly endothermic and draws heat from burner 30. Burner 30 generates heat and is configured to provide heat to reformer 32. As shown in FIG. 3B, burner 30 comprises two burners 30a and 30b and their respective burner chambers 105a and 105b that surround reformer 32. In one embodiment, burner 30 uses electrical resistance and electrical energy to produce heat.

In the embodiment shown, burner 30 employs catalytic combustion to produce heat. A catalyst 104 disposed in each burner chamber 105 helps a burner fuel passed through the chamber generate heat. Burner 30 includes an inlet that receives methanol 17 from boiler 108 via a channel in one of end plates 82 or 84. In one embodiment, methanol produces heat in burner 30 and catalyst 104 facilitates the methanol production of heat. In another embodiment, waste hydrogen from fuel cell 20 produces heat in the presence of catalyst 104. Suitable burner catalysts 104 may include platinum or palladium coated onto alumina pellets for example. Other materials suitable for catalyst 104 include iron, tin oxide, other noble-metal catalysts, reducible oxides, and mixtures thereof. The catalyst 104 is commercially available from a number of vendors known to those of skill in the art as small pellets. The pellets that may be packed into burner chamber 105 to form a porous bed or otherwise suitably filled into the burner chamber volume. Catalyst 104 pellet sizes may be varied relative to the cross sectional size of burner chamber 105. Catalyst 104 may also comprise catalyst materials listed above coated onto a metal sponge or metal foam or wash coated onto the walls of burner chamber 105. A burner outlet port 89 (FIG. 3A) communicates exhaust formed in burner 30 outside of fuel processor 15.

Some fuel sources generate additional heat in burner 30, or generate heat more efficiently, with elevated temperatures. Fuel processor 15 includes a boiler 108 that heats methanol before burner 30 receives the fuel source. In this case, boiler 108 receives the methanol via fuel source inlet 85. Boiler 108 is disposed in proximity to burner 30 to receive heat generated in burner 30. The heat transfers via conduction through monolithic structure from burner 30 to boiler 108 and via convection from boiler 108 walls to the methanol passing therethrough.

Air including oxygen enters fuel processor 15 via air inlet port 91. Burner 30 uses the oxygen for catalytic combustion of methanol. Dewar 150 is configured such that air passing through dewar chamber 156 receives heat generated in burner 30. Dewar 150 offers thus two functions for fuel processor 15: a) it permits active cooling of components within fuel processor 15 before the heat reaches an outer portion of the fuel processor, and b) it pre-heats the air going to burner 30. Air first passes along the outside of dewar 150 before passing through apertures in the dewar and along the inside of dewar 150. This heats the air before receipt by air inlet port 93 of burner 30. A burner 30 in fuel processor 15 generates heat and typically operates at an elevated temperature. In one embodiment, fuel processor 15 comprises a dewar 150 to improve thermal management for fuel processor 15. Dewar 150 at least partially thermally isolates components internal to housing 152—such as burner 30—and contains heat within fuel processor 15.

Although the present invention will primarily be described with respect to the annular reformer and burner shown in FIGS. 3A and 3B, it is anticipated that fuel cell systems described herein are also applicable to other fuel processor designs. Many architectures employ a planar reformer disposed on top or below to a planar burner. Micro-channel designs fabricated in silicon commonly employ such stacked planar architectures and would benefit from fuel cell systems described herein. Further description of planar fuel processors suitable for use with the present invention are included in commonly owned co-pending patent application entitled "Planar Micro Fuel Processor" naming Ian Kaye as inventor and filed on the same day as this patent application, which is incorporated by reference for all purposes.

4. Efficient Fuel Cell Systems

Fuel processor components operate at elevated temperatures. Burner 30 temperatures from about 200 degrees Celsius to about 800 degrees Celsius are common. Many fuel cells 20 require elevated temperatures for electrical energy production. More specifically, the electrochemical reaction responsible for hydrogen consumption and electrical energy generation typically requires an elevated temperature. Start temperatures in the MEA layer 62 and its constituent parts greater than 150 degrees Celsius are common.

Figure 4A:
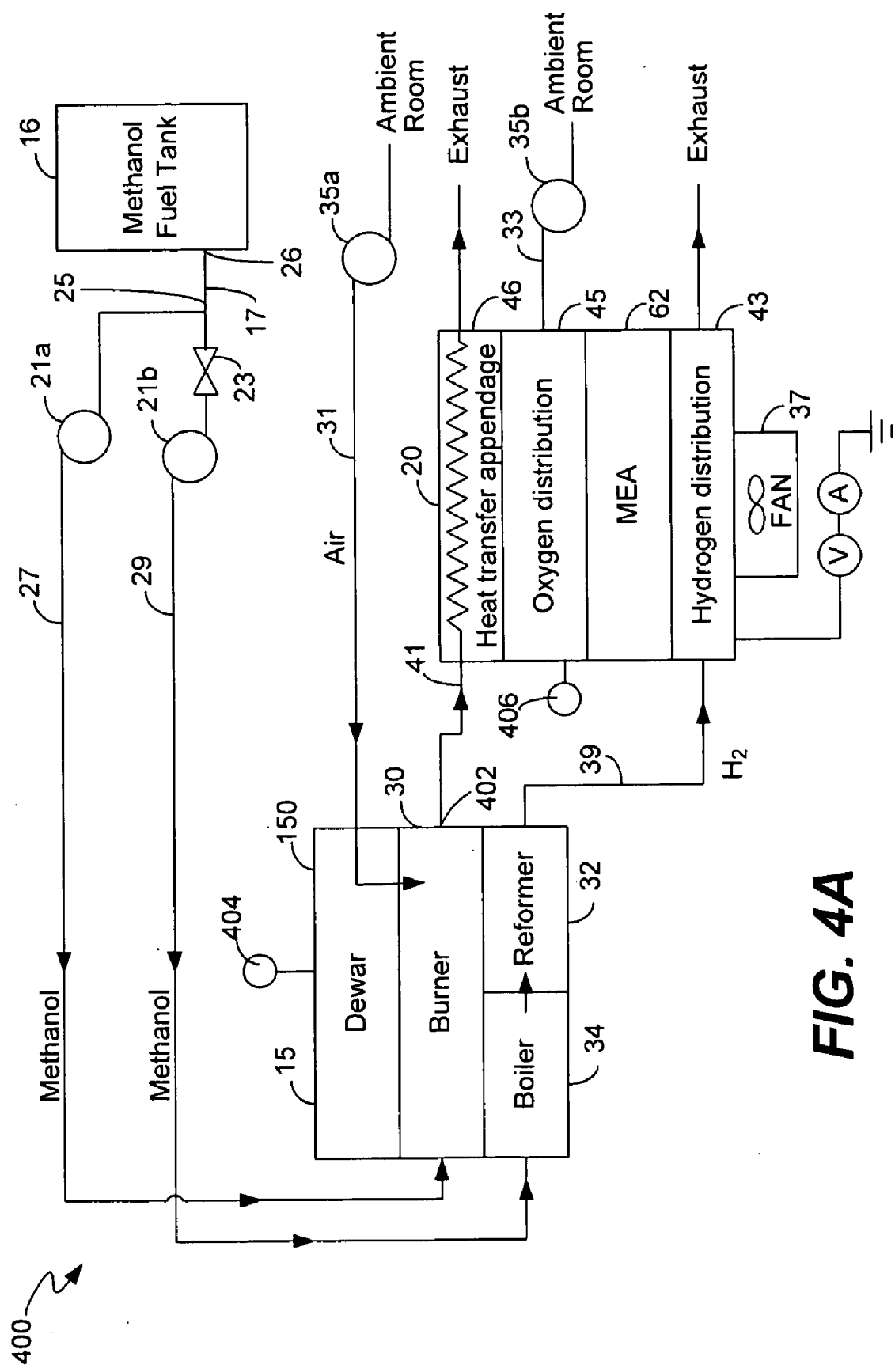
FIG. 4A illustrates a heat efficient fuel cell system in accordance with one embodiment of the present invention.

One embodiment of the present invention heats internal portions of fuel cell 20 using heat generated in fuel processor 15 or gases exhausted from fuel processor 15 that can be used for catalytic combustion in fuel cell 20. FIG. 4A illustrates a heat efficient fuel cell system 400 in accordance with one embodiment of the present invention. System 400 runs gases exhausted from burner 30 to fuel cell 20 to provide heat to fuel cell 20.

System 400 comprises components of system 10 described with respect to FIG. 1B and also comprises plumbing configured to transport a heating medium from fuel processor 15 to fuel cell 20. As the term is used herein, plumbing may comprise any tubing, piping and/or channeling that communicates a gas or liquid from one location to a second location. The plumbing may also comprise one or more valves, gates or other devices to facilitate and control flow. A fan or pump may also be included to pressurize a line and move the heating medium. Plumbing between burner 30 and fuel cell 20 includes an outlet 402 on fuel processor 15 that exhausts heated gases from burner 30 to a line 41, which transmits the heated gases to fuel cell 20. A 'line' refers to tubing, piping and/or channeling that is dedicated for fluid or gas communication between two locations.

In a specific embodiment, line 41 transports the heated gases to fan 37, which moves the heated gases within fuel cell 20 and across the fuel cell stack and heat transfer appendages. Alternatively, the plumbing may be configured to transport the heating medium from burner 30 to one or more heat transfer appendages. In this case, line 41 may continue through the fuel cell housing and open in the proximity of the heat transfer appendages. A hole in the fuel cell housing then allows line 41 to pass therethrough or connect to a port that communicates the gases to plumbing inside the fuel cell for delivery to the fuel cell stack and heat transfer appendage. For catalytic heat generation in fuel cell 20, the plumbing may also transport the heating medium to facilitate gaseous interaction with the catalyst, such as plumbing delivery to one or more bulkheads.

In one embodiment, the heating medium comprises heated gases exhausted from burner 30. A catalytic burner or electrical resistance burner operates at elevated temperatures. Cooling air exhausted from an electric burner or product gases exhausted from a catalytic burner are often greater than about 100 degrees Celsius when the gases leaves the fuel processor. For many catalytic burners, depending on the fuel source employed, the heating medium is commonly greater than about 200 degrees Celsius when the heating medium leaves the fuel processor. These heated gases are transported to the fuel cell for convective heat transfer in the fuel cell, such as passing the heated gases over one or more heat transfer appendages 46 for convective heat transfer from the warmer gases into the cooler heat transfer appendages.

In another embodiment, burner 30 is a catalytic burner and the heating medium comprises the fuel source. Catalytic combustion in burner 30 is often incomplete and the burner exhaust gases include unused and gaseous methanol. Fuel cell 20 then comprises a thermal catalyst that facilitates production of heat in the fuel cell in the presence of methanol. The fuel source is typically vaporized prior to reaching the burner to facilitate catalytic combustion. In this case, line 41 transports the gaseous and unused methanol to the thermal catalyst in fuel cell 20. Several suitable thermal catalyst arrangements for transferring heat into heat transfer appendages 46 were described above (see FIGS. 2A and 2F). Suitable methanol catalysts, such as platinum or palladium coated onto alumina pellets, were also described above with respect to catalyst 104 in burner 30.

System 400 also comprises one or more sensors to help regulate thermal management in system 400. A temperature sensor 404 detects temperature for a component in fuel processor 15. Sensor 406 may be arranged within burner 30 for detecting the temperatures within the burner. Other components in fuel processor 15 whose temperature may be monitored by sensor 404 include: reformer 32, boiler 34, boiler 108 and gases at the inlet at outlet ports of each of these components. A temperature sensor 406 detects temperature for a component in fuel cell 20. For example, sensor 406 may be arranged in contact with the substrate 89 of one or more bi-polar plates 44 for detecting the temperature of the plate. Other component in fuel cell 20 whose temperature may be monitored by sensor 406 include: MEA layer 62 and gases in an inlet or outlet manifold. Suitable temperature sensors for use with the present invention are widely commercially available from numerous sources known to those of skill in the art.

Figure 4B:
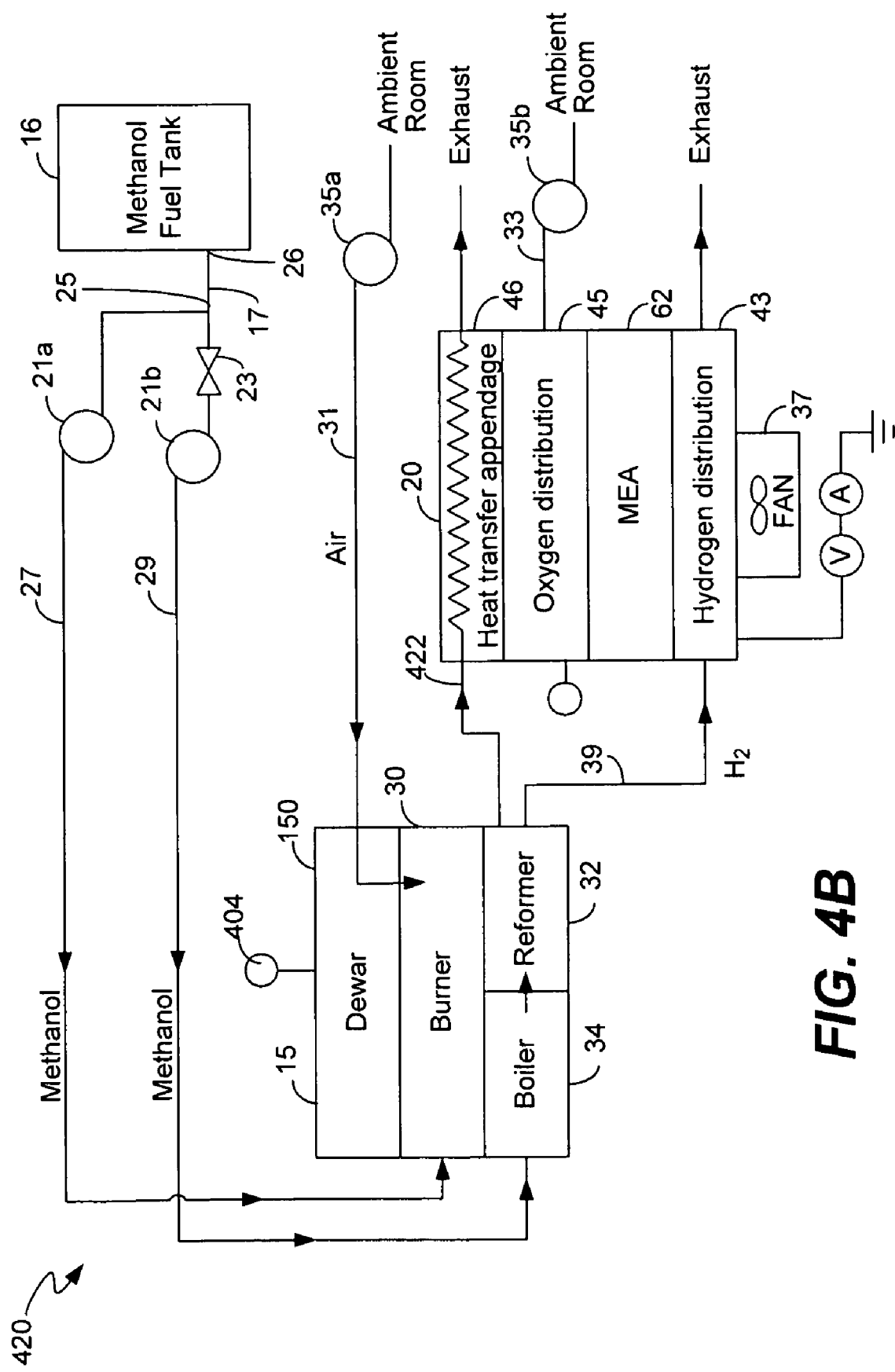
FIG. 4B illustrates a heat efficient fuel cell system in accordance with another embodiment of the present invention.

FIG. 4B illustrates a heat efficient fuel cell system 420 in accordance with another embodiment of the present invention. System 420 comprises plumbing configured to transport a heating medium from reformer 32 to fuel cell 20 to provide heat to fuel cell 20. As shown, line 422 transports reformer exhaust from an outlet port of reformer 32 to heat transfer appendage 46. Line 422 may also transport the reformer exhaust to fan 37, which moves the heated gases within fuel cell 20 and across the heat transfer appendages. In another embodiment, reformer 32 includes a single output that splits into line 422 for reformer exhaust heating in fuel cell 20 and into line 39 for hydrogen delivery to the anode. A valve may be employed to control flow between the two lines.

In one embodiment, the reformer exhaust is at an elevated temperature corresponding to the temperature in reformer 32. Reformer exhausts above 100 degrees Celsius are common. Heat in the reformer exhaust then convects onto the heat transfer appendage to heat the fuel stack and its internal components. In another embodiment, hydrogen production in reformer 32 is often incomplete and the reformer exhaust gases include unused and gaseous methanol. Fuel cell 20 then comprises a thermal catalyst that facilitates production of heat in the fuel cell in the presence of methanol. Boiler 34 vaporizes the methanol prior to reaching reformer 32. In this case, line 422 transports the gaseous and unused methanol to the thermal catalyst in fuel cell 20. Suitable methanol catalysts, such as platinum or palladium coated onto alumina pellets, were also described above with respect to catalyst 104 in burner 30. Alternatively, fuel cell 20 may include a thermal catalyst that facilitates production of heat in the fuel cell in the presence of hydrogen. In this case, the heating medium comprises hydrogen produced in reformer 32. Suitable hydrogen catalysts that help hydrogen produce heat include platinum or palladium, for example. Several suitable thermal catalyst arrangements for transferring heat into heat transfer appendages 46 were described above (see FIGS. 2A and 2F).

FIGS. 4A and 4B illustrate two systems 400 and 420 that transport a heating medium from the fuel processor to the fuel cell. The present invention may flexibly employ heating from fuel processor 15 to fuel cell 20 for improving efficiency of the fuel cell system. For example, a heating medium may be passed over one or more appendages 46 during start up of fuel cell 20, or during periods of electrical generation inactivity when fuel cell 20 is cooling from elevated temperatures associated with operation.

Figure 5:
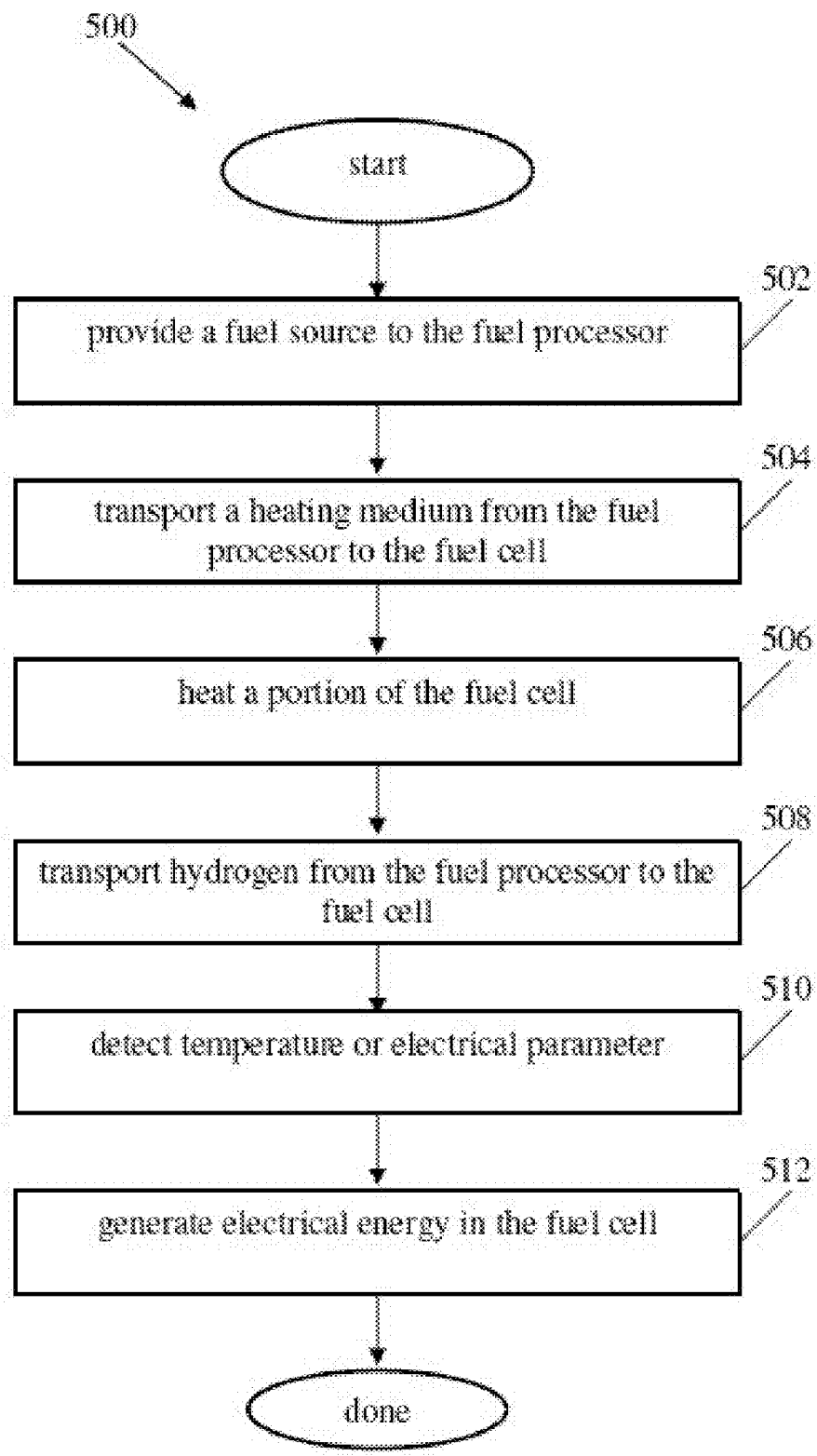
FIG. 5 illustrates a process flow for generating electrical energy in a fuel cell that receives hydrogen from a fuel processor in accordance with one embodiment of the present invention.

FIG. 5 illustrates a process flow 500 for generating electrical energy in a fuel cell that receives hydrogen from a fuel processor in accordance with one embodiment of the present invention. The fuel processor is configured to process a fuel source to produce the hydrogen and comprises a burner and a reformer.

Process flow 500 begins by providing the fuel source to the fuel processor (502). Supply from fuel storage 16 is described above with respect to FIGS. 1A and 1B. When the fuel processor comprises a catalytic burner, the fuel source is supplied to both the reformer and burner and is used in the burner to generate heat. A catalyst in the reformer receives heat from the burner and reforms the fuel source to produce hydrogen.

Process flow 500 then transports a heating medium from the fuel processor to the fuel cell when a component in the fuel cell has a temperature that is less than a threshold temperature or when electrical energy output by the fuel cell includes less than an electrical threshold (504). Electrical energy output by the fuel cell is typically dc power characterized by a dc voltage and current. The electrical threshold then refers to a desired electrical output for the fuel cell. For example, if the fuel cell electrical output drops below 0.54 Volts per cell, then load from the fuel cell may be turned off and the heating medium transported from the fuel processor to the fuel cell. The electrical threshold may be represented as a desired output according to a polarization curve for the fuel cell, which is stored in software available to the controller of the fuel cell system. The polarization curve represents acceptable electrical energy output for the fuel cell.

For temperature monitoring, the fuel cell component refers to a portion of the fuel cell whose temperature affects fuel cell performance. The threshold temperature refers to a desired temperature to begin external heating of the component. For a functional component of the fuel cell, the threshold temperature may relate to a required temperature for the component to contribute to electrical energy generation. Operating temperatures in the MEA 62 and its constituent parts greater than 190 degrees Celsius are common. An MEA 62 comprising a Celtec 1000 electrolyte from PEMEAS USA AG mentioned above may require operating temperatures greater than 100 degrees Celsius. The component may alternatively comprise a bi-polar plate, a gas diffusion layer, a membrane, or any other component mentioned above with respect to fuel cell 20. The threshold temperature may also vary based on the component being sensed. Detecting temperature of a bi-polar plate on an external surface of the fuel cell stack allows the temperature sensor to remain outside the stack. In this case, the threshold temperature may accommodate the difference in temperature between an outside portion of the plate where the sensor attaches and an inside portion proximate to the MEA. Temperature variation in a single plate may range from 2 to 5 degrees Celsius for example. In general, the threshold temperature may vary between about 50 degrees Celsius and about 1000 degrees Celsius for some fuel cell components.

In one embodiment, the heating medium is transported to the fuel cell during a start-up period before the fuel cell begins generating electrical energy, e.g., in response to a request for electrical energy. Heating a fuel cell in this manner allows fuel cell component operating temperatures to be reached sooner and expedites warm-up time needed when initially turning on fuel cell 20.

In another embodiment, the heating medium is transported from the fuel processor to the fuel cell during a period of non-activity in which the fuel cell does not produce electrical energy and the component cools (502). Since many fuel cells require elevated temperatures for operation and the electrical energy generating process is exothermic, the fuel cell usually does not require external heating during electrical energy generation. However, when electrical energy generation ceases for an extended time and the component drops below a threshold operating temperature, the heating medium may then be transported from the fuel processor to regain the operating temperature and resume electrical energy generation. This permits operating temperatures in a fuel cell to be maintained when electrical energy is not being generated by the fuel cell.

The heating medium then heats a portion of the fuel cell (506). The heating medium may comprise heated exhaust (including air, combustion products and unused methanol) from a burner or heated exhaust from a reformer (including air, reforming reactants and reforming products such as hydrogen). Heating may also employ catalytic combustion in the fuel cell. During fuel cell system start-up, the reformer may not yet have reached its operating temperature and the exhaust/heating medium may comprise a high concentration of CO and un-processed fuel (also referred to as 'dirty hydrogen') that is unsuitable for use in a fuel cell. The hydrogen may be catalytically combusted to generate heat in a portion of the fuel cell responsible for heat generation. Suitable examples of heat transfer appendage techniques to heat a fuel cell and its internal components with the heating medium are described above.

Process flow 500 detects electrical output of the fuel cell and/or temperature for the component (510) before transportation of the heating medium begins, and afterwards. Logic implemented by a controller then compares the detected parameter with stored values for either threshold. For detecting current and voltage, the controller logic compares the measured amount with a stored polarization curve. If the measured voltage or current is output by the fuel cell is about equal to or greater than an electrical threshold, or a shift in the polarization curve has occurred, then flow of the heating medium may begin, and in some cases, electrical energy generation may cease. The component temperature may similarly be read and compared with stored values.

When the component temperature drops below the threshold temperature or the electrical output returns to an unacceptable condition, then flow of the heating medium may stop, e.g., using a valve between the fuel processor and fuel cell. Similarly, if the component temperature subsequently rises above the threshold temperature, then flow of the heating medium may again resume. Thus, when needed, process flow 500 transports hydrogen from the fuel processor to the fuel cell (508). Electrical energy is generated (512) in the fuel cell when the temperature of the component is about equal to or greater than the threshold temperature or when electrical energy output by the fuel cell is about equal to or greater than an electrical threshold.

Efficient systems and methods of the present invention may also transport hydrogen in the fuel cell system to burner 30 in fuel processor 15. A catalyst in the burner then reacts with the hydrogen to produce heat in the burner. The hydrogen may come from the anode exhaust of fuel cell 20 and/or from the reformer 32 exhaust.

Figure 6:
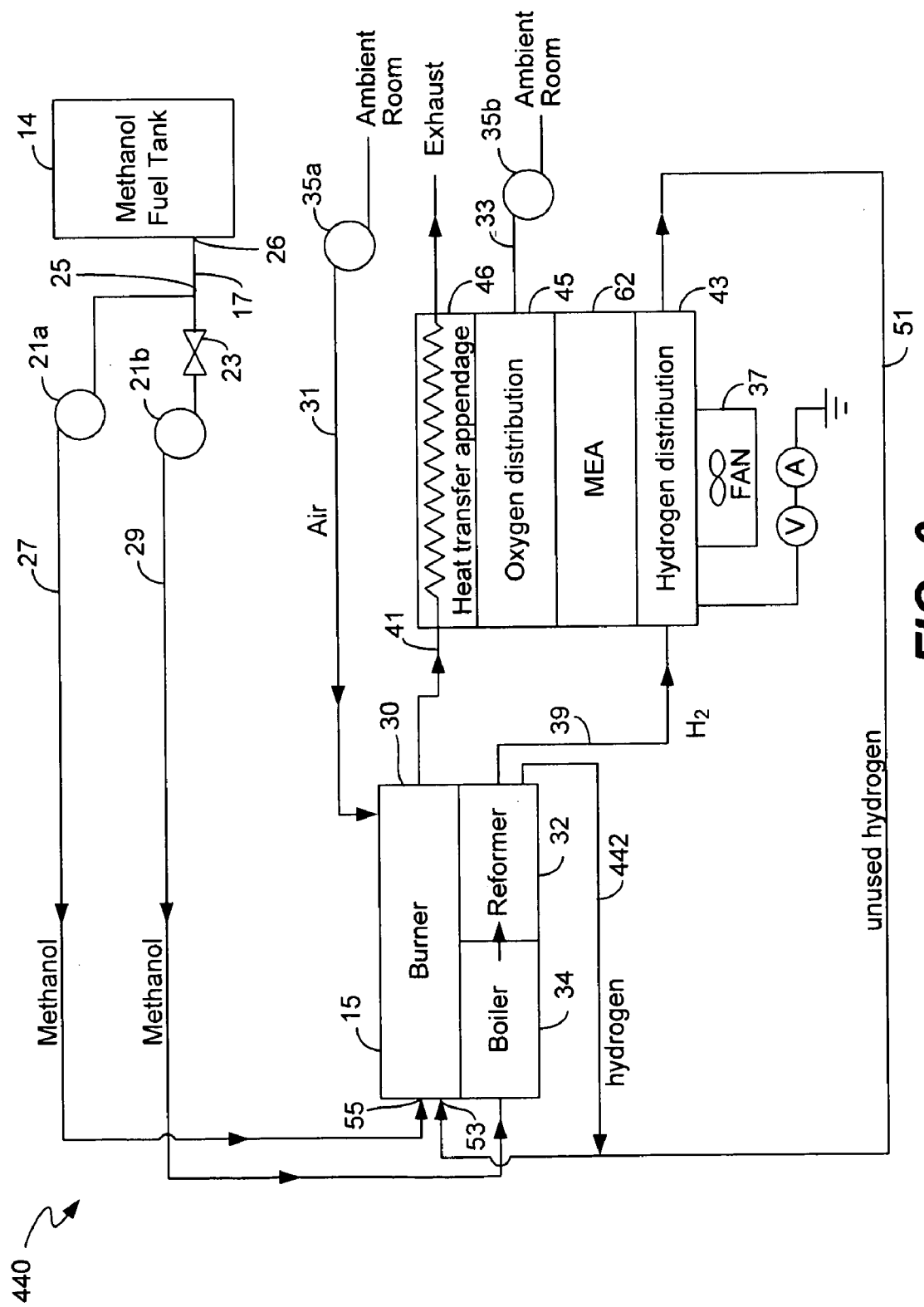
FIG. 6 illustrates an embodiment of the fuel cell system of FIG. 1A that routes hydrogen from an anode exhaust of the fuel cell back to a burner in the fuel processor.

FIG. 6 illustrates a fuel system 440 that routes unused hydrogen from fuel cell 20 back to burner 30 in accordance with one embodiment of the present invention. Burner 30 includes a thermal catalyst that reacts with the unused hydrogen to produce heat.

Fuel system 440 comprises plumbing that is configured to transport hydrogen to burner 30. Line 51 is configured to transmit unused hydrogen from fuel cell 20 to burner 30 of fuel processor 15. For system 440, burner 30 includes two inlets: an inlet 55 configured to receive the hydrogen fuel source 17 and an inlet 53 configured to receive the hydrogen from line 51. Anode gas collection channels, which distribute hydrogen provided by fuel processor 15 to each membrane electrode assembly layer, collect and exhaust the unused hydrogen to a hydrogen exhaust manifold (see FIGS. 2A-2F), which delivers the hydrogen to line 51. In one embodiment, gaseous delivery in line 51 back to fuel processor 15 relies on pressure at the exhaust of the anode gas distribution channels, e.g., in the anode exhaust manifold. In another embodiment, an anode recycling pump or fan is added to line 51 to pressurize line 51 and return unused hydrogen back to fuel processor 15. A fan may also pressurize line 39 to deliver the hydrogen from an outlet of fuel processor 15 to an anode inlet of fuel cell 20, which also pressurizes flow of hydrogen in line 51.

Since hydrogen consumption within fuel cell 20 is often incomplete and the anode exhaust often includes unused hydrogen, re-routing the anode exhaust to burner 30 allows fuel cell system 10 to capitalize on unused hydrogen in fuel cell 20 and increase hydrogen usage and efficiency in system 10.

Line 442 is configured to transmit hydrogen output by reformer 32 to burner 30 of fuel processor 15. Before a reformer reaches its operating temperature upon system start from a cool temperature or rest state, imperfect hydrogen generation at low temperatures may lead to reformer output that is unsuitable for use in a fuel cell. In situations where the reformer output is unsuitable, fuel system 440 re-routes hydrogen and reformer exhaust to burner 30 via line 442. Burner 30 catalytically uses the hydrogen to produce heat. The heat may be provided to the reformer to expedite warm up time for fuel processor 15 and fuel cell system 440.

Fuel cell system 440 provides flexibility to use different fuels in a catalytic burner 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures.

Figure 8:
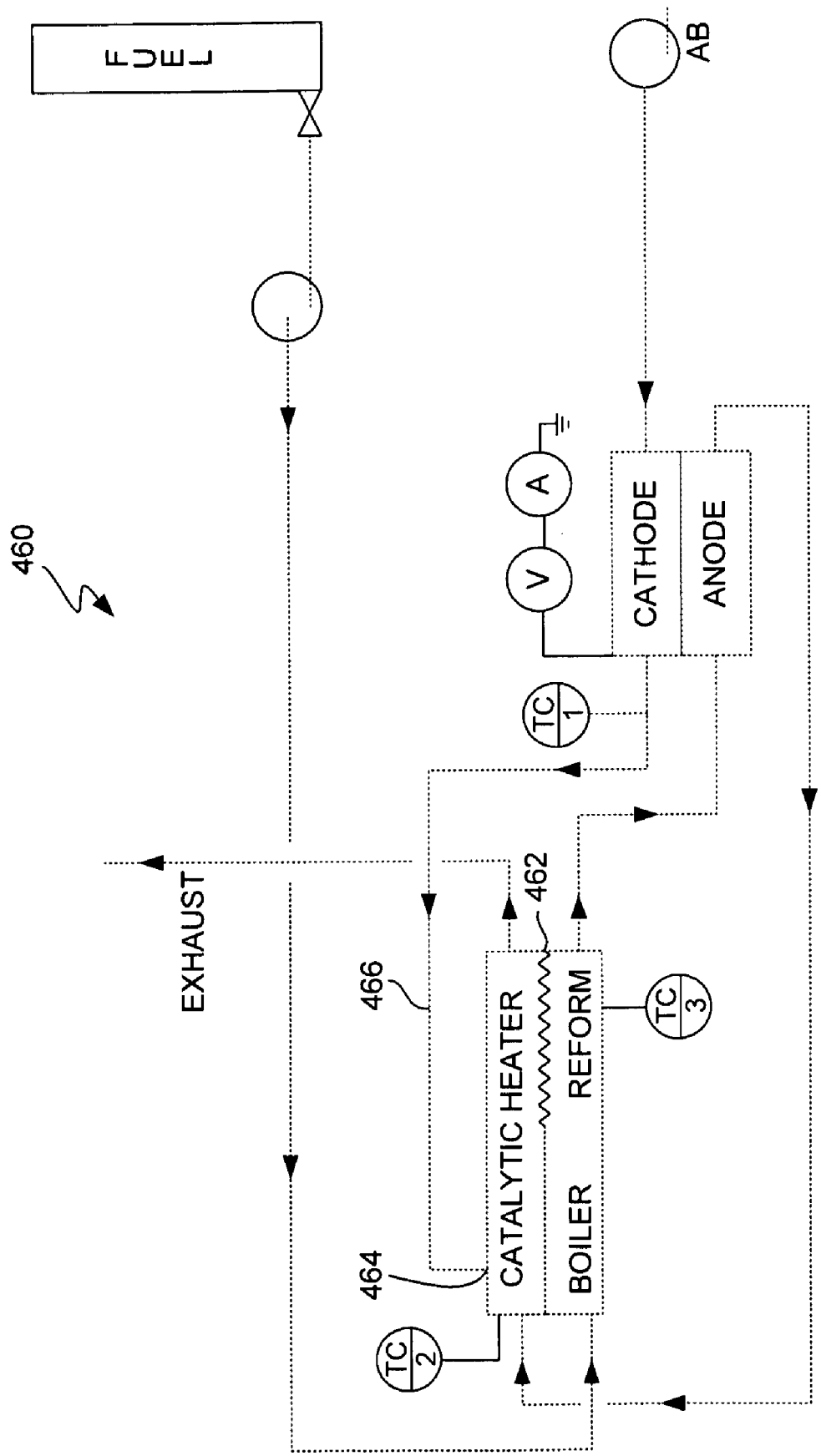
FIG. 8 illustrates a schematic operation for a fuel cell system in accordance with another specific embodiment of the present invention.

FIG. 8 illustrates a schematic operation for a fuel cell system 460 in accordance with another specific embodiment of the present invention. Burner 30 is configured to receive oxygen from an oxygen exhaust included in fuel cell 20. Cathode gas collection channels, which distribute oxygen and air from the ambient room to each membrane electrode assembly layer, collect and exhaust any unused oxygen in fuel cell 20. Line 466 receives unused oxygen from an exhaust manifold, which collects oxygen from each cathode gas collection channel. Line 466 transports the oxygen to an inlet 464 of burner 30. Since oxygen consumption within fuel cell 20 is often incomplete and the cathode exhaust includes unused oxygen, re-routing the cathode exhaust to burner 30 allows fuel cell system 10 to capitalize on unused oxygen in fuel cell 20 and increase oxygen usage and efficiency in system 10. Fuel cell 20 also heats the oxygen before burner 30 receives the oxygen. Oxygen in the air provided to burner 30 is consumed as part of the combustion process. Heat generated in the burner 30 will heat cool incoming air, depending on the temperature of the air. This heat loss to incoming cool air reduces the heating efficiency of burner 30, and typically results in a greater consumption of methanol. To increase the heating efficiency of burner 30, the present invention heats the incoming air in fuel cell 20 so less heat generated in the burner passes into the incoming air. In other words, fuel cell 20 allows pre-heats air before reaching the burner, thus increasing efficiency of system 460.

Fuel cell system 460 also transports unused hydrogen from the anode of fuel cell 20 back to the burner of fuel processor 15 for catalytic combustion and generation of heat. Fuel cell system 460 also employs an electric heater 462 for heating reformer 32 with electrical energy.

5. Electronics Device Implementation

Figure 9:
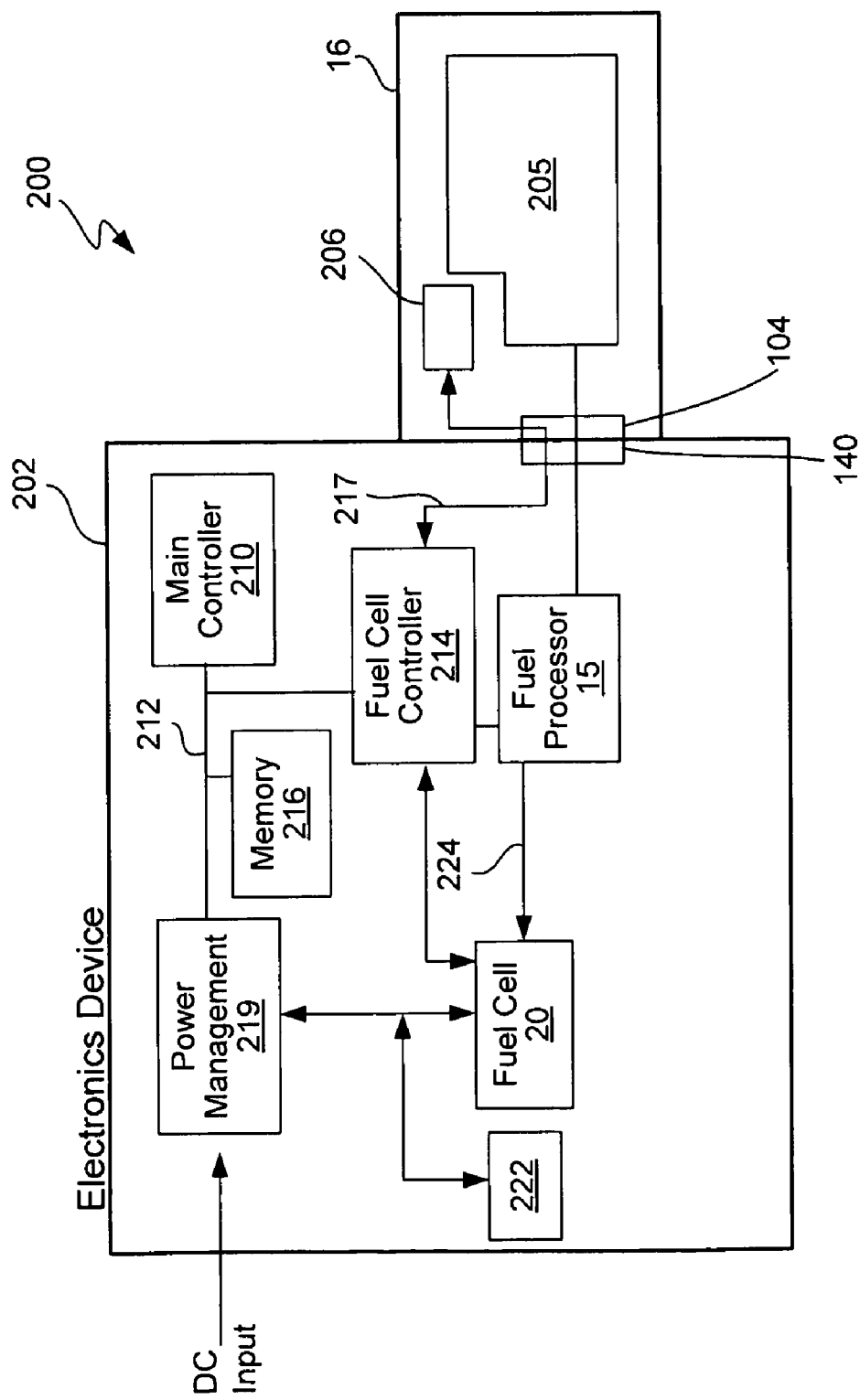
FIG. 9 illustrates of a system for producing electrical energy for a portable electronics device in accordance with one embodiment of the present invention.

FIG. 9 shows a schematic illustration of a system 200 for producing electrical energy in a portable electronics device 202 in accordance with one embodiment of the present invention. System 200 comprises fuel processor 15 and fuel cell 20 included within an electronics device 202 and a hydrogen fuel source storage device 16 coupled to electronics device 202 via connector 104 and mating connector 140.

In one embodiment, fuel processor 15 and fuel cell 20 are incorporated into electronics device 202 (within its volume and outer housing) as an integral module, and storage device 16 is a removable device. Fuel cell powered laptop computers 202 may comprise slightly modified existing products, with fuel processor 15 and fuel cell 20 and related system components fitted generally into the space provided for a battery pack. Mating connector 140 is included in this allocated space for connection to a removable storage device 16. Storage device 16 mechanically interfaces with electronics device 202. In one embodiment, connectors 104 and 140 provide sufficient mechanical force to maintain position between the storage device 16 and electronics device 202. In another embodiment, electronics device 202 includes a mechanical slot that storage device 16 fits and slides into.

When connector 104 and mating connector 140 interface, fuel cell system controller 214 digitally communicates with memory 106 using link 217 for bi-directional communication therebetween. In another embodiment, controller 214 uses a wireless interrogator to communicate with an RFID antennae and memory 206 included in storage device 16. Controller 214 may read any information stored in memory 206 such as a fuel type stored in the storage device 16, a model number for storage device 16, a volume capacity for bladder 205 or storage device 16, a number of refills provided to storage device 16, the last refill date, the refilling service provider, and a current volume for the storage device. Controller 214 estimates the remaining power in storage device 16 by comparing the fuel source 17 level since last use or refill against a consumption rate for a particular laptop computer. Controller 214 may also write transient information to memory 106, such as an updated volume for the storage device. The controller 214 communicates with a main controller 210 for computer 202 and computer memory 218 via communications bus 212. Computer memory 218 may store instructions for the control of fuel system 10 such as read and write protocol and instructions for communication with a digital memory 106.

Power management 219 controls power provision by fuel cell system 10 and electrochemical battery 222. Thus, power management 219 may inform controller 214 how much power is needed for laptop computer 22 operation and controller 214 responds by sending signals to fuel cell 20, fuel processor 15 and a pump that draws fuel from storage device 16 to alter fuel cell power production accordingly. If fuel cell system 10 runs out of fuel source 17, then power management 219 switches to electrical power provision from battery 222.

System 200 may also be configured for 'hot swappable' capability. Hot swapping of storage device 16 refers to removing storage device 16 from a fuel processor or electronics device 202 it provides hydrogen fuel source 17 to, without shutting down the receiving device or without compromising hydrogen fuel source provision to the receiving device for a limited time. A hot swappable system implies fuel source provision when connector 104 and mating connector 140 are separated. Further description of hot swappable fuel cell systems suitable for use with the present invention are described in commonly owned co-pending patent application entitled "Portable Fuel Cartridge for Fuel Cells" naming Ian Kaye as inventor and filed on the same day as this patent application, which is incorporated by reference for all purposes.

Main controller 210 is preferably a commercially available microprocessor such as one of the Intel (including Pentium™) or Motorola family of chips, a reduced instruction set computer (RISC) chip such as the PowerPC™ microprocessor available from Motorola, Inc, or any other suitable processor. Memory 216 may comprise some form of mass storage but can be eliminated by providing a sufficient amount of RAM to store user application programs and data. Memory 216 may also contain the basic operating system for the computer system 350. It is generally desirable to have some type of long term mass storage such as a commercially available hard disk drive, nonvolatile memory such as flash memory, battery backed RAM, PC-data cards, or the like. Regardless of computer system configuration, it may employ one or more memories or memory modules configured to store program instructions for controlling fuel cell and thermal systems described herein. Such memory or memories may also be configured to store data structures, control programs, or other specific non-program information described herein.

In addition, although the present invention is primarily described with respect to fuel cell systems and methods operating on a fuel cell system, many of the methods and techniques described constitute system controls and will comprise digital control applied by control logic that implements instructions from stored software. The control logic includes any combination of hardware and software needed for control within system 10. For example, the control logic may include instructions stored in memory 216 that are executed by main controller 210. The stored instructions may correspond to any methods or elements explained in the process flows described herein. Input/output logic may be employed to facilitate communication between main controller 210 and components of fuel system 10. In one embodiment, the control logic is configured to regulate heat transfer or temperature in system 10 by controlling the routing of liquids and gases between fuel cell 20, fuel processor 15 and electronics device 202. In a specific embodiment, the control logic is configured to start fuel system 10. This includes control logic configured to start a fuel processor including a reformer and a burner that provides heat to the reformer. In another specific embodiment, the control logic is configured to shut down a fuel cell system comprising a fuel cell that received hydrogen from a fuel processor including a reformer and a burner that provided heat to the reformer. In another specific embodiment, the control logic is configured to regulate the transport of a heating medium from the fuel processor to the fuel cell when electrical energy output by the fuel cell includes less than an electrical threshold or when temperature of a component in the fuel cell is less than a temperature threshold. In this case, memory 216 may include one or more polarization curves that help determine when to transport of the heating medium.

6. Fuel System Start Up

Another aspect of the present invention relates to methods for improving fuel cell system start up. Fuel cell system components often require elevated temperatures before electrical energy production occurs. Techniques described herein expedite the time needed for fuel cell system start up.

Many fuel processors avoid providing a liquid fuel source to a burner or reformer catalyst. During normal operation, a boiler vaporizes the fuel source before receipt by the burner or reformer. However, a boiler may not have sufficient heat during start-up to heat the fuel source. In this case, the present invention heats and vaporizes a fuel source using electrically generated heat that may be readily turned on during fuel processor and system start-up.

Figure 10A:
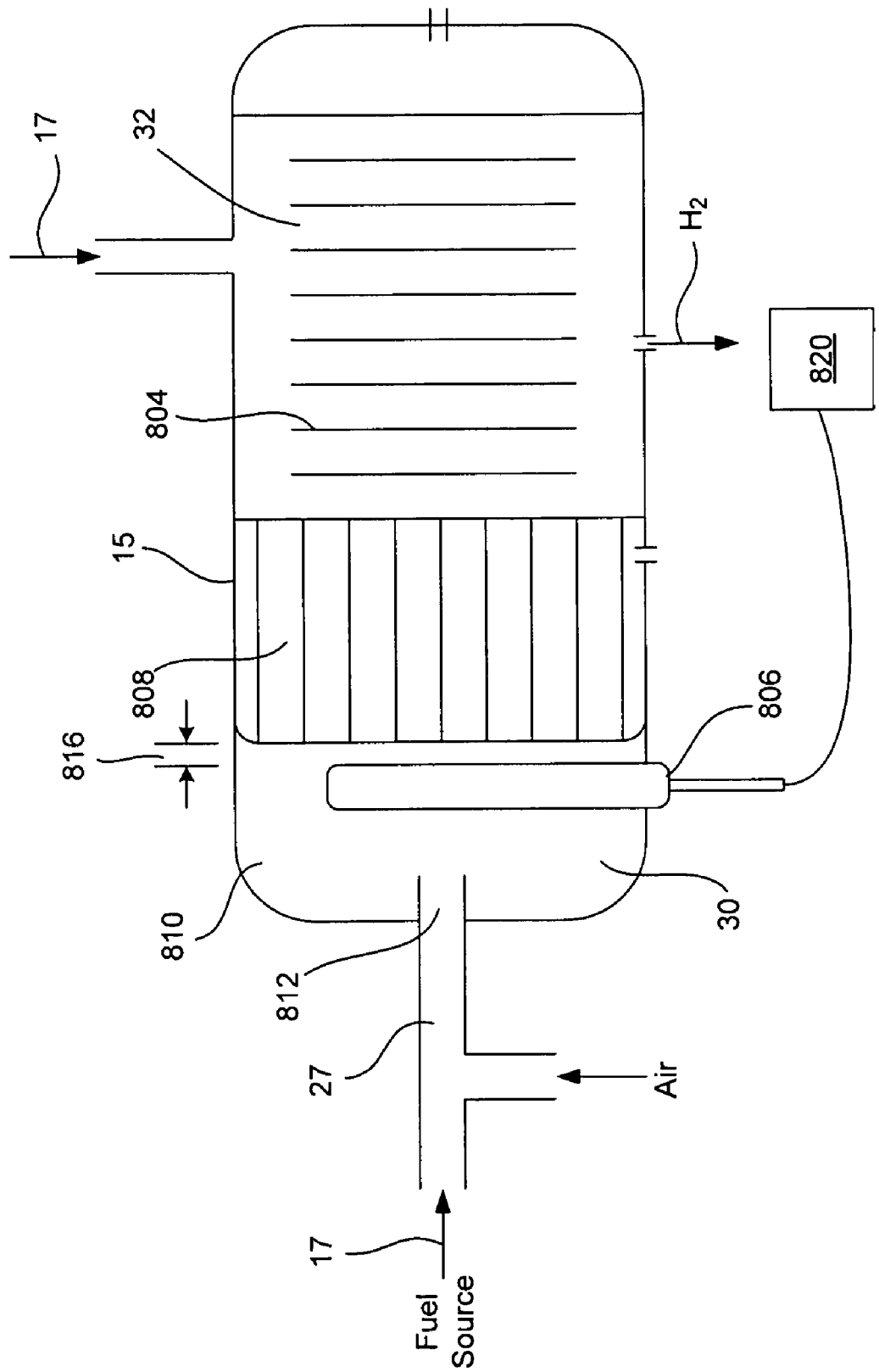
FIG. 10A illustrates a system for heating a fuel source before catalytic heat generation within burner 30 in accordance with one embodiment of the present invention.

FIG. 10A illustrates a system for heating a fuel source before catalytic heat generation within burner 30 in accordance with one embodiment of the present invention. As shown, the system includes a fuel processor 15 and an electric heater 806. The fuel processor 15 comprises a reformer 32, burner 30 and boiler 34, which were described above with respect to FIG. 1A. Reformer 32 comprises a catalyst 804 that facilitates the production of hydrogen. Catalyst 804 reacts with methanol 17 and facilitates the production of hydrogen gas. In one embodiment, catalyst 804 comprises pellets packed to form a porous bed or otherwise suitably filled into the volume of the reformer chamber.

Burner 30 comprises a catalyst bed 808 that helps a burner fuel passed through the burner chamber generate heat. In one embodiment, methanol produces heat in burner 30 and catalyst 808 facilitates methanol-based production of heat. In another embodiment, waste hydrogen from fuel cell 20 produces heat in the presence of catalyst 808. Suitable burner catalysts 808 may include platinum or palladium coated onto alumina pellets for example.

Electric heater 806 is configured to heat burner 30 or the fuel source 17 provided to burner 30. As shown, electrical heater 806 is disposed within the burner chamber 810 and intercepts the fuel source 17 before the fuel source passes over catalyst bed 808. In this case, a portion of chamber 810 is reserved for electrical heater 806 and heating of fuel source 17. A small gap 816 is left between heater 806 and catalyst 808 to allow room for the fuel source 17 to heat, vaporize and spread within the burner chamber. Gap 816 sizes from about 2 millimeters to about 5 millimeters are suitable for many small fuel processors.

Electrical heaters suitable for use in fuel processor 15 may employ a resistive heating element. A rechargeable battery, capacitor or other electrical power supply 820 provides electrical energy to heater 806. In one embodiment, a fuel cell that receives hydrogen from fuel processor 15 outputs electrical energy to recharge the capacitor 820. Electric heater 806 may comprise a thin-film platinum, gold, graphite, nickel, chromium, aluminum, alloy or other base metal that may be deposited and used for a resistive heater. A model P/N CSS-01110 cartridge heater as provided by Omega of Stamford, Conn. is suitable for use as electrical heater 806 in some embodiments.

Electric heater 806 may also comprise a catalyst disposed on an outside surface of heater 806 that generates heat in the presence of fuel source 17. Platinum, for example, may be coated onto the external surface of the heater to interact with fuel source 17 to generate heat in the presence of the fuel source. The catalytic heat then increases heat generation and warming of the incoming fuel source 17.

In another embodiment, electrical heater 806 is embedded in the burner catalyst bed 808 and heats the catalyst bed 808. In this case, an insulating cover is used to electrically isolate heater 806 from catalyst 808. The insulating cover includes a high temperature, electrically insulating material, such as a ceramic tube. Alternatively, electrical heater 806 may be disposed external to burner 30 and in thermal communication with fuel source supply 27 to heat fuel source 17 before it enters burner 30. A heat exchanger may be employed to facilitate heat transfer between supply 27 line and heater 806.

Burner 30 shows a common inlet 812 that receives both fuel source 17 and air that have been mixed prior to entry into burner chamber 810. In another embodiment, burner 30 includes two separate and dedicated inlets for fuel source 17 and air, respectively. The dedicated fuel source inlet may also comprise an atomizing nozzle to facilitate vaporization of the fuel source.

Thermal communication between burner 30 and reformer 32 also allows heat generated by electrical heater 806 to heat fuel source 17 entering reformer 32. In another embodiment, the present invention employ electrical heat to warm a reformer or reformer catalyst during start-up. FIG. 10C illustrates a system for electrically heating a reformer 32 in accordance with one embodiment of the present invention.

Reformer comprises an inlet 31*a* that receives fuel source 17, catalyst 804 and an outlet 31*b* that outputs hydrogen gas. In one embodiment, reformer 32 is sized for portable applications and comprises a reformer chamber having a volume greater than about 0.1 cubic centimeters and less than about 50 cubic centimeters. Reformer 32 volumes between about 0.5 cubic centimeters and about 2 cubic centimeters are suitable for laptop computer applications. Further description of annular fuel processors suitable for use with the present invention are included in commonly owned co-pending patent application entitled "Annular Fuel Processor and Methods" naming Ian Kaye as inventor and filed on the same day as this patent application, which is incorporated by reference for all purposes.

Electric heater 806 is configured to heat reformer 32. As shown, electric heater 806 is embedded in the reformer 32 catalyst 804 bed. An insulating cover, such as a ceramic tube, electrically isolates heater 806 from catalyst 804. In this case, the electric heater 806 applies heat directly into the reforming catalyst 804 so that the whole fuel processor 15 is not heated at startup. This brings the fuel cell online (even at reduced power) faster. In addition, disposing the electric heater 806 in thermal contact with the reformer 32 catalyst minimizes external power requirements from a battery or capacitor.

Heater 806 heats reformer 32 or catalyst 804 during fuel processor start-up. A temperature sensor 818 detects the temperature of the reformer catalyst bed or a wall of reformer 32. When the catalyst 804 reaches a desired temperature for example, heater 806 is turned off. Burner 30 comprises an inlet 33 that receives the fuel source 17. A catalyst bed 808 in burner 30 heats reformer 32 after electric heater 806 is turned off. Electric heater 806 readily thus heats up reformer 32 and allows it to reach operating temperature quickly, with assistance from burner 30 if needed and a minimal amount of electrical heat input.

An electric heater may also be employed when the fuel processor is constructed using MEMS technology. In one MEMs design, a reformer comprises three separate chips: a heater/boiler chip, a reformer/heater chip and a preferential oxidizer chip. All three chips may have a glass cover and share common manifolds that direct process gasses to the correct chip. The heater/boiler chip has a thin film heater deposited in the flow channels, suitable for use during startup. The heater/reformer and preferential oxidizer chips include MEMS deposited temperature sensors either on the flow channels, or on the glass cover. Deposition of thin film heaters and sensors is well understood to those of skill in MEMS technology.

Figure 10B:
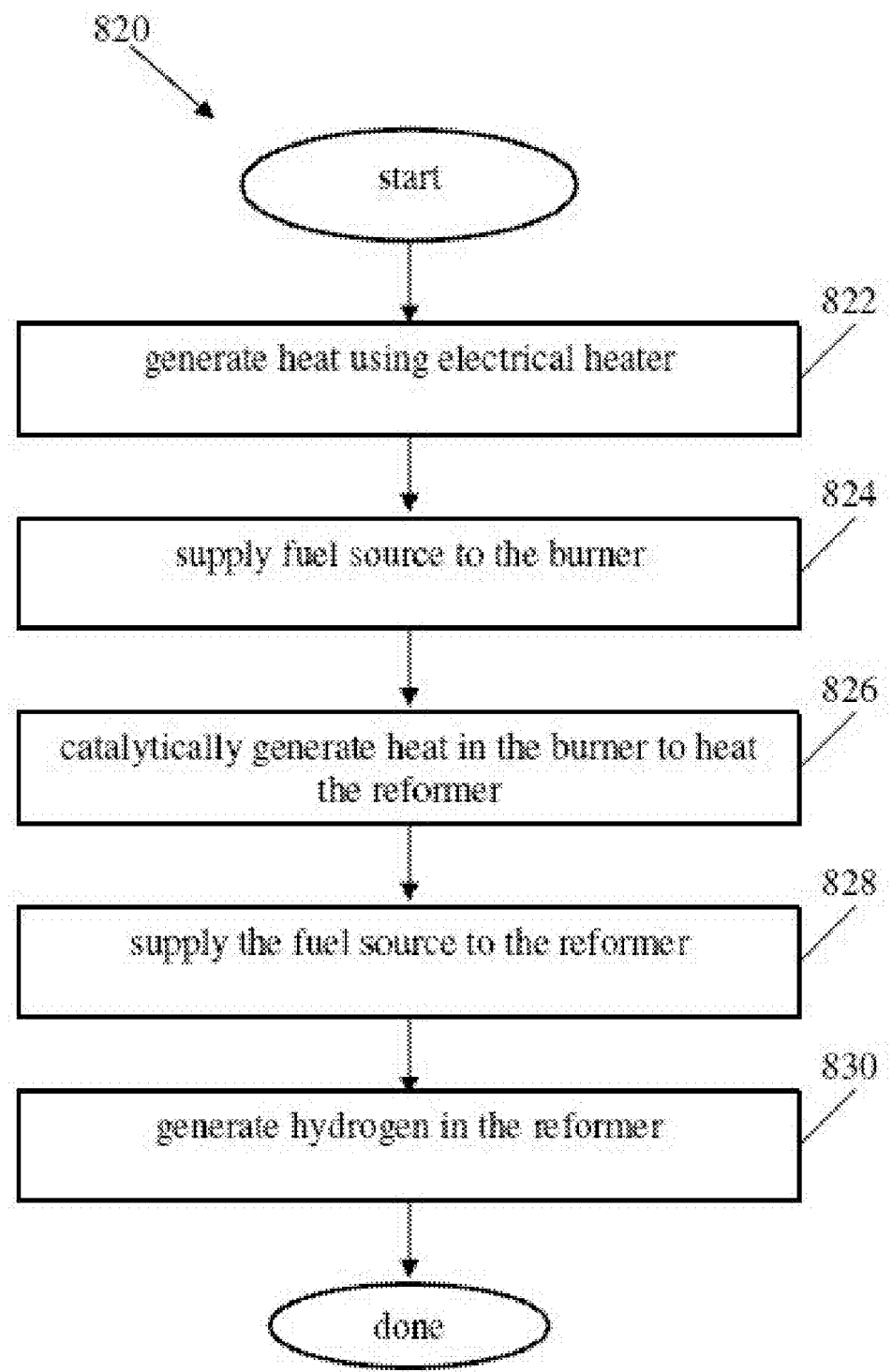
FIG. 10B illustrates a process flow for starting up a fuel processor in accordance with one embodiment of the present invention.
Figure 10C:
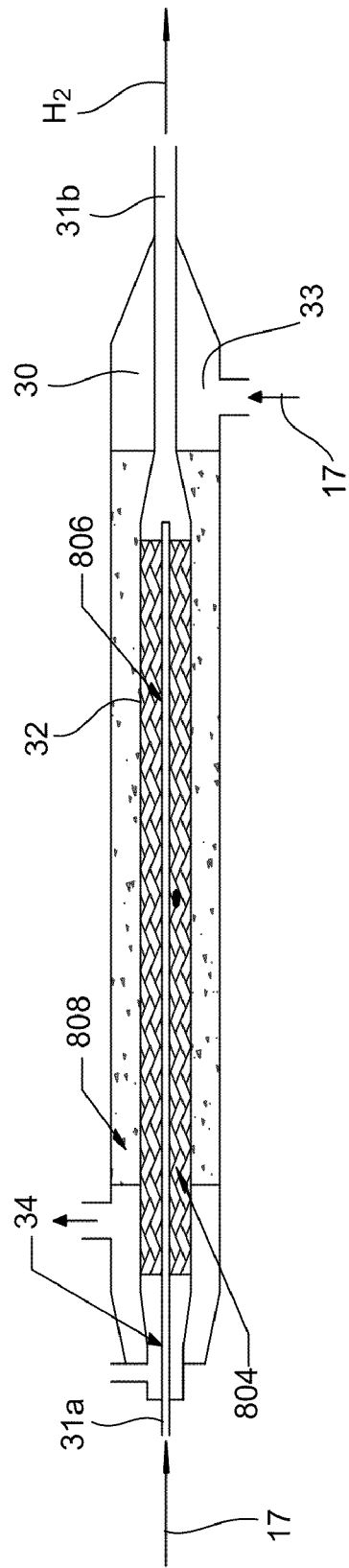
FIG. 10C illustrates a system for electrically heating a reformer in accordance with one embodiment of the present invention.

FIG. 10B illustrates a process flow 820 for starting up a fuel processor in accordance with one embodiment of the present invention. The fuel processor includes a reformer and a burner that provides heat to the reformer. A fuel cell receives hydrogen produced by the fuel processor.

Process flow 820 begins by generating heat using an electrical heater that is configured to heat the burner or a fuel source provided to the burner (822). The electrical heater may also be configured to heat the reformer or a fuel source provided to the reformer. The heat may vaporize the fuel source. The electrical heater generates heat for a set duration or until a particular operating condition is reached. In one embodiment, the electrical heater generates heat for at least ten seconds before the fuel source is supplied to the burner. Some fuel processors may be heated for 30 seconds, up to a minute, or even longer. A threshold start temperature may also be used to determine the heating duration. A temperature sensitive catalyst, burner or reformer may require that the electrical heater generate heat until the catalyst, burner or reformer reaches a threshold start temperature. Some burner catalysts include a threshold start temperature above 60 degrees Celsius. Some reformer catalysts include a threshold start temperature above 100 degrees Celsius. Alternatively, the electrical heater generates heat until the reformer walls reach 150 degrees Celsius or some other operating temperature. In one embodiment, air and the fuel source mix before the fuel source reaches the burner and electrical heater. In this case, the electrical heater may be disposed outside the burner to pre-heat the fuel source before entering the burner.

Process flow 820 then supplies the fuel source to the burner (822). Typically, a pump moves the fuel source and turns on via a system controller. The controller may also turn on a fan that provides air to the burner. A catalyst in the burner then catalytically generates heat in the burner to heat the reformer (824). The fuel source enters the burner before the reformer reaches its operating temperature. If the burner catalyst requires a lower operating temperature than the reformer catalyst, catalytic heat generation in the burner may be used to continue heating the reformer—and the electric heater is turned off after the fuel source is supplied to the burner. If the reformer has not yet reached its operating temperature, the reformer exhaust may comprise a high concentration of CO and un-processed fuel ('dirty hydrogen') that is unsuitable for use in a fuel cell. As described above, the hydrogen may be routed from a reformer outlet to a burner inlet to react with a thermal catalyst in the burner and generate additional heat in the burner to expedite the time needed for the reformer to reach operating temperature.

The fuel source is then supplying to the reformer (826). A catalyst in the reformer then catalytically generates hydrogen (828). Plumbing transports the hydrogen to a fuel cell that generates electricity using the hydrogen. In one embodiment, the electrical heater receives energy from a capacitor that is recharged by the fuel cell after the fuel cell system gains a steady operating status. The capacitor or rechargeable battery may also be recharged during system start-up when then fuel cell is at limited capacity, e.g., about 5-15% rated power. At this point, the fuel cell power is enough to operate the electric heater, and the startup capacitor or rechargeable battery can be turned off or recharged.

7. Fuel System Shutdown

Figure 7:
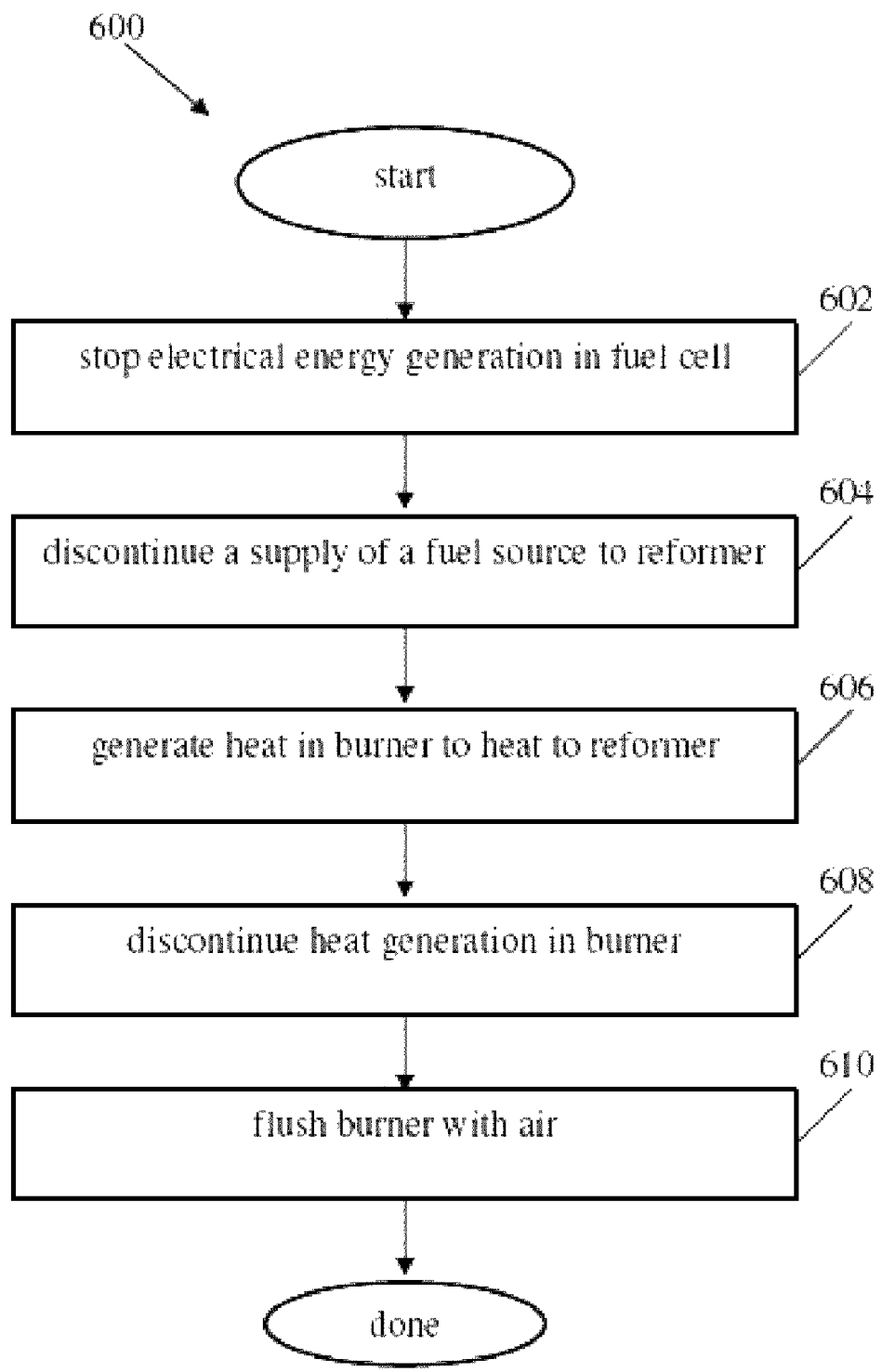
FIG. 7 illustrates a process flow for shutting down a fuel cell system comprising a fuel cell that received hydrogen from a fuel processor in accordance with one embodiment of the present invention.

The present invention also includes methods for shutting down a fuel cell system. FIG. 7 illustrates a process flow 600 for shutting down a fuel cell system comprising a fuel cell that received hydrogen from a fuel processor in accordance with one embodiment of the present invention. The fuel processor includes a reformer and a burner that provided heat to the reformer. Process flow 600 is particularly useful to expunge any liquids in the fuel cell system, including those present when the system is initially shut down and those that accumulate via condensation as the system cools.

Process flow 600 begins by stopping electrical energy generation in the fuel cell (602). This may occur electrically by varying the charge in the anode and/or cathode. Hydrogen supply to the fuel cell may also be ceased, e.g., using a valve on a line that transports hydrogen to the fuel cell.

Process flow 600 then discontinues a supply of the fuel source to the reformer. For system 10 of FIG. 1B, valve 23 disposed on line 29 between fuel tank 14 and reformer 32 cuts fuel source provision to the reformer. Cutting power to a pump may also be used to discontinue the fuel supply. Heat is then generated in the burner to heat to the reformer after discontinuing the supply of the fuel source to the reformer (506). In some cases, heat generation in the burner may continue for greater than about 30 seconds after discontinuing the supply of the fuel source to the reformer. Alternatively, heat generation in the burner may continue unless the fuel cell load has dropped below 10% rated power for a few minutes or unless a polarization curve for the fuel cell has lowered, e.g., the voltage of the fuel cell has reduced significantly for a given current.

Heat generation in the burner is then discontinued (508). For an electric burner, this may be done via an electrical switch or digital control. For a catalytic burner such as that used in system 10 of FIG. 1B, the burner then includes an inlet to receive the fuel source from a supply of the fuel source and the burner catalytically generates heat using the fuel source. A valve disposed on a line 27 between a fuel tank 14 and reformer 32 may cut fuel supply to the reformer. The burner is then flushed with air (510). Air supply may continue for greater than about 60 seconds after discontinuing the supply of the fuel source to the reformer. Alternatively, air supply may continue until the burner temperature reaches a threshold cooling temperature, such as 80 degrees Celsius The above steps sufficiently shut down the reformer and ensure no fuel is left in the reformer chamber or burner.

The present invention may also shut down the fuel cell. To do so, air is provided to a cathode gas distribution system in the fuel cell after discontinuing hydrogen supply to the fuel cell. Powering a fan that pressurizes air supply to the cathode gas distribution system may do this. The fuel cell may also be cooled. For system 10 of FIG. 1B, fan 37 may be turned on to move cooling air across the heat transfer appendages 46 until a desired shut-down temperature is reached. Both fans may run until the fuel cell is cooled to a desired temperature and moisture has been removed by the air supply from the cathode gas distribution system.

8. Conclusion

While this invention has been described in terms of several preferred embodiments, there are alterations, permutations, and equivalents that fall within the scope of this invention which have been omitted for brevity's sake. For example, although the present invention has been described with respect to methods operating on a fuel cell system, many of the methods and techniques described constitute system controls and will comprise digital control applied by a processor that implements instructions from stored software. While not described in detail, such digital control of a mechanical system is well known to one of skill in the art and the present invention may thus relate to instructions stored in software capable of carrying out methods described herein. It is therefore intended that the scope of the invention should be determined with reference to the appended claims.

What is claimed is:

1. A method for generating electrical energy in a fuel cell that receives hydrogen from a fuel processor configured to process a fuel source to produce the hydrogen, the method comprising:
providing the fuel source to the fuel processor;
monitoring both a temperature and an electrical energy output to determine whether a temperature threshold or an electrical threshold is reached;
transporting a heating medium from the fuel processor to the fuel cell when one of the electrical threshold and the temperature threshold is reached, wherein the electrical threshold is reached when electrical energy output by the fuel cell includes less than an electrical threshold and the temperature threshold is reached when temperature of a component in the fuel cell is less than a temperature threshold, and wherein the heating medium comprises exhaust of a burner in the fuel processor;

heating a portion of the fuel cell;

transporting hydrogen from the fuel processor to the fuel cell;

detecting temperature of the component or electrical output of the fuel cell; and generating electrical energy in the fuel cell when one of the electrical and temperature thresholds is reached, wherein the temperature threshold is reached when the temperature of the component is about equal to or greater than the threshold temperature and the electrical threshold is reached when electrical energy output by the fuel cell is about equal to or greater than an electrical threshold.

2. The method of claim 1 wherein the heating medium is transported from the fuel processor to the fuel cell during a start-up period before the fuel cell begins generating electrical energy in response to a request for electrical energy.

3. The method of claim 1 wherein the heating medium is transported to a heat transfer appendage included in the fuel cell, wherein the heat transfer appendage a) includes a portion arranged external to a fuel cell stack included in the fuel cell and b) is in conductive thermal communication with an internal portion of the fuel cell stack.

4. The method of claim 1 wherein the heating medium is greater than about 100 degrees Celsius when the heating medium leaves the fuel processor.

5. The method of claim 1 wherein the heating medium comprises the fuel source.

6. The method of claim 3 wherein the fuel cell comprises a thermal catalyst disposed in contact with or in proximity to the heat transfer appendage that facilitates heat generation with exposure to the heating medium.

7. The method of claim 6 wherein transporting the heating medium from the fuel processor to the fuel cell occurs when electrical energy output by the fuel cell includes less than a threshold voltage or a threshold current.

8. The method of claim 1 wherein the threshold voltage or a threshold current is included in a polarization curve for the fuel cell.

9. The method of claim 1 wherein the heating medium comprises hydrogen produced in the fuel processor.

10. The method of claim 1 wherein the component is included in a membrane electrode assembly included in the fuel cell stack.

11. The method of claim 1 wherein the component is a bi-polar plate included in the fuel cell stack.

12. The method of claim 1 further comprising generating heat in a burner included in the fuel processor using the fuel source and a catalyst that facilitates the production of heat in the presence of the fuel source.

13. A method for generating electrical energy in a fuel cell that receives hydrogen from a fuel processor configured to process a fuel source to produce the hydrogen, the method comprising:

providing the fuel source to the fuel processor;

monitoring both a temperature and an electrical energy output to determine whether a temperature threshold or an electrical threshold is reached;

transporting a heating medium from the fuel processor to the fuel cell when one of the electrical threshold and the temperature threshold is reached, wherein the electrical threshold is reached when electrical energy output by the fuel cell includes less than an electrical threshold and the temperature threshold is reached when temperature of a component in the fuel cell is less than a temperature threshold;

heating a portion of the fuel cell;

transporting hydrogen from the fuel processor to the fuel cell;

detecting temperature of the component or electrical output of the fuel cell; and generating electrical energy in the fuel cell when one of the electrical and temperature thresholds is reached, wherein the temperature threshold is reached when the temperature of the component is about equal to or greater than the threshold temperature and the electrical threshold is reached when electrical energy output by the fuel cell is about equal to or greater than an electrical threshold; and discontinuing transportation of the heating medium from the fuel processor to the heat transfer appendage when the temperature of the component is less than the threshold temperature.

14. The method of claim 1 further comprising reforming the fuel source to produce hydrogen in the fuel processor.

15. The method of claim 13, wherein the heating medium is transported from the fuel processor to the fuel cell during a start-up period before the fuel cell begins generating electrical energy in response to a request for electrical energy.

16. The method of claim 13, wherein the heating medium is transported to a heat transfer appendage included in the fuel cell, wherein the heat transfer appendage a) includes a portion arranged external to a fuel cell stack included in the fuel cell and b) is in conductive thermal communication with an internal portion of the fuel cell stack.

17. The method of claim 16, wherein the fuel cell comprises a thermal catalyst disposed in contact with or in proximity to the heat transfer appendage that facilitates heat generation with exposure to the heating medium.

18. The method of claim 17, wherein transporting the heating medium from the fuel processor to the fuel cell occurs when electrical energy output by the fuel cell includes less than a threshold voltage or a threshold current.

19. The method of claim 13, wherein the threshold voltage or a threshold current is included in a polarization curve for the fuel cell.

20. The method of claim 13, wherein the component is included in a membrane electrode assembly included in the fuel cell stack.

* * * * *